US011867994B2

(12) United States Patent
Wang et al.

(10) Patent No.: US 11,867,994 B2
(45) Date of Patent: Jan. 9, 2024

(54) DISPLAY MODULE AND HEATING METHOD THEREOF

(71) Applicant: Shanghai AVIC OPTO Electronics Co., Ltd., Shanghai (CN)

(72) Inventors: Xiangchun Wang, Shanghai (CN); Xiaoyuan Ding, Shanghai (CN); Guanzhong Xiong, Shanghai (CN); Jian Zhao, Shanghai (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 382 days.

(21) Appl. No.: 17/139,486

(22) Filed: Dec. 31, 2020

(65) Prior Publication Data

US 2021/0124210 A1 Apr. 29, 2021

(30) Foreign Application Priority Data

Oct. 30, 2020 (CN) ......................... 202011198081.2

(51) Int. Cl.

*G02F 1/1333* (2006.01)
*G01K 7/16* (2006.01)
*H05B 1/02* (2006.01)
*H05B 3/34* (2006.01)

(52) U.S. Cl.

CPC ......... *G02F 1/133382* (2013.01); *G01K 7/16* (2013.01); *H05B 1/0202* (2013.01); *H05B 1/023* (2013.01); *H05B 3/34* (2013.01); *H05B 2203/005* (2013.01); *H05B 2203/016* (2013.01); *H05B 2203/035* (2013.01)

(58) Field of Classification Search

CPC .......... G01K 7/16; G01K 7/206; H05B 1/023; H05B 3/34; H05B 1/0202; H05B 2203/016; H05B 2203/035; H05B 2203/005; G02F 1/133382

USPC .......................................................... 219/210

See application file for complete search history.

(56) References Cited

U.S. PATENT DOCUMENTS 5,376,561 A * 12/1994 Vu .................... H01L 29/78648 438/459
6,143,582 A * 11/2000 Vu .................... H01L 29/78648 438/257
6,627,953 B1 * 9/2003 Vu ....................... H04N 5/7441 257/E29.295
9,366,896 B2 * 6/2016 Yamazaki ........... G02F 1/13338
(Continued)

FOREIGN PATENT DOCUMENTS

CN 110297348 A 10/2019

*Primary Examiner* — Eric S Stapleton
(74) *Attorney, Agent, or Firm* — Alston & Bird LLP

(57) ABSTRACT

A display module includes: a heating circuit, a gating circuit and a plurality of heating lines. The heating circuit includes a first type of heating signal output terminal and a second type of heating signal output terminal, and the gating circuit includes a gating unit. The first type of heating signal output terminal is electrically connected to a first type of signal input terminal of the gating unit, and a first type of signal output terminal of the gating unit is electrically connected to a first terminal of a heating line; and/or the second type of heating signal output terminal is electrically connected to a second type of signal input terminal of the gating unit, and a second type of signal output terminal of the gating unit is electrically connected to a second terminal of the heating line.

17 Claims, 16 Drawing Sheets

(56) References Cited

U.S. PATENT DOCUMENTS

| | | | | |
|---|---|---|---|---|
| 2015/0153608 | A1* | 6/2015 | Kondoh | G02F 1/133308 349/150 |
| 2015/0370120 | A1* | 12/2015 | Song | G02F 1/133382 349/58 |
| 2017/0251724 | A1* | 9/2017 | Lamb | A24F 40/60 |

* cited by examiner

DISPLAY MODULE AND HEATING METHOD THEREOF

CROSS-REFERENCE TO RELATED APPLICATIONS

This application claims the priority to Chinese Patent Application No. CN202011198081.2, entitled "DISPLAY MODULE AND HEATING METHOD THEREOF", filed on Oct. 30, 2020, the disclosure of which is incorporated herein by reference in its entirety.

TECHNICAL FIELD

Embodiments of the present disclosure relate to the field of display techniques and, in particular, to a display module and a heating method thereof.

BACKGROUND

As display techniques develop, a liquid crystal display panel and an organic light-emitting display panel have gradually become two mainstream display panels. The liquid crystal display panel includes a color filter substrate, an array substrate, and liquid crystals sandwiched between the color filter substrate and the array substrate. The luminance of a pixel is controlled by changing the deflection angles of the liquid crystals. However, at low temperatures such as tens of degrees below zero ° C., the viscosity coefficient of the liquid crystal material increases when the response speed becomes low, affecting the normal display of the liquid crystal display panel.

Currently, a heating device is usually provided in a liquid crystal display panel. The heating device often includes a plurality of heating lines and a heating circuit that provides heating power for the heating lines. However, as the size of the liquid crystal display panel increases, the number of heating lines needed doubles, resulting in an increase in the number of heating circuits or in design difficulty, thus increasing the cost of the display module.

SUMMARY

A display module is provided in the present disclosure so as to achieve that the number of heating circuits and the design difficulty do not increase with the increase in the number of heating lines and that the cost of the display module is reduced.

In a first aspect, a display module is provided in an embodiment of the present disclosure and includes a display panel, a control circuit, a heating circuit, a gating circuit and a plurality of heating lines.

The heating circuit includes at least one first type of heating signal output terminal and at least one second type of heating signal output terminal, the gating circuit includes at least one gating unit, a gating signal output terminal of the control circuit is electrically connected to a gating signal input terminal of the gating circuit, and a heating control signal output terminal of the control circuit is electrically connected to a heating control signal input terminal of the heating circuit.

The heating circuit and the gating circuit comprise at least one of the following connection modes: each of the at least one first type of heating signal output terminal is electrically connected to a first type of signal input terminal of a gating unit among the at least one gating unit, and a first type of signal output terminal of the gating unit among the at least one gating unit is electrically connected to a first terminal of a heating line among the plurality of heating lines; or each of the at least one second type of heating signal output terminal is electrically connected to a second type of signal input terminal of the gating unit among the at least one gating unit, and a second type of signal output terminal of the gating unit among the at least one gating unit is electrically connected to second terminals of a plurality of heating lines among the plurality of heating lines.

First terminals of heating lines electrically connected to a same one of the at least one gating unit are electrically connected to a same one of the at least one first type of heating signal output terminal.

In a second aspect, a heating method of a display module is provided in an embodiment of the present disclosure. The heating method is applicable to the display module described in the first aspect and includes steps described below.

The control circuit sends a heating control signal to the heating circuit and a gating signal to the gating circuit.

In response to the heating control signal, the heating circuit sends a heating signal to the gating circuit.

In response to a turn-on level of the gating signal, the gating circuit transmits the heating signal to a heating line electrically connected to the gating circuit.

In response to the heating signal, the heating line heats the display panel.

According to the display module provided in the embodiments of the present disclosure, the display module includes the control circuit, the gating circuit, the heating circuit and the plurality of heating lines. The control circuit controls the level state (turn-on level or turn-off level) of each gating signal sent to the gating circuit such that the heating circuit can provide heating signals for a plurality of heating lines in a time-sharing manner. Furthermore, the plurality of heating lines provides heat for the display panel in the display module in the time-sharing manner, solving the problem, in the related art, of an increase in the number of heating circuits or in the design difficulty caused by an increase in the number of heating lines, and achieving the effects of not increasing the number of heating circuits and of reducing the cost of the display module.

DETAILED DESCRIPTION

Figure 1:
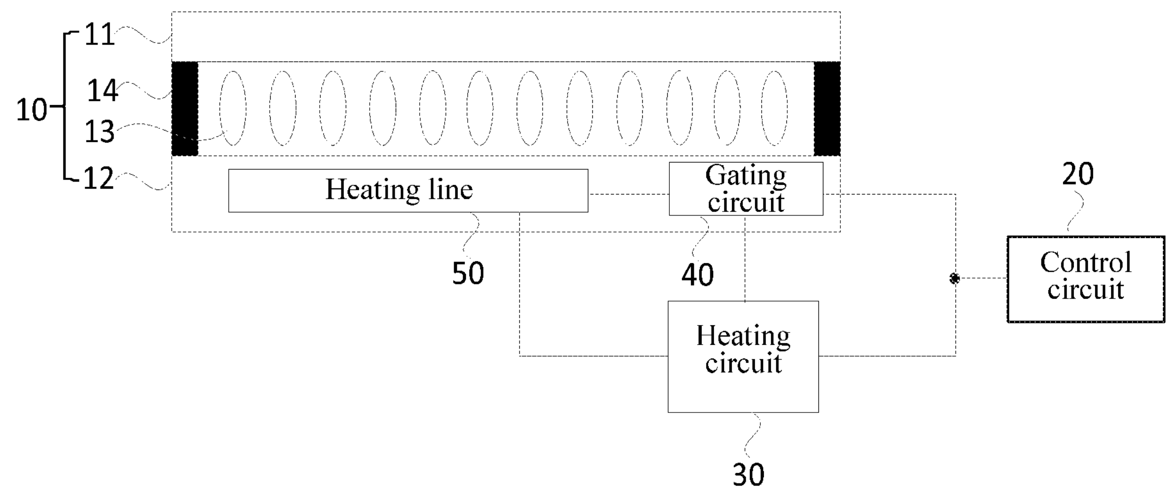
FIG. 1 is a schematic structure diagram of a display module according to an embodiment of the present disclosure.

Hereinafter the present disclosure will be further described in detail in conjunction with drawings and embodiments. It is to be understood that the embodiments set forth herein are intended to explain the present disclosure and not to limit the present disclosure. Additionally, it is to be noted that for ease of description, merely part, not all, of the structures related to the present disclosure are illustrated in the drawings.

In view of the problem mentioned in BACKGROUND, a display module is provided in an embodiment of the present disclosure and includes a display panel, a control circuit, a heating circuit, a gating circuit and a plurality of heating lines.

The heating circuit includes at least one first type of heating signal output terminal and at least one second type of heating signal output terminal. The gating circuit includes at least one gating unit, and a gating signal output terminal of the control circuit is electrically connected to a gating signal input terminal of the gating circuit; the heating circuit and the gating circuit comprise at least one of the following connection modes: a first type of heating signal output terminal is electrically connected to a first type of signal input terminal of a gating unit, and a first type of signal output terminal of the gating unit is electrically connected to a first terminal of a heating line; or a second type of heating signal output terminal is electrically connected to a second type of signal input terminal of the gating unit, and a second type of signal output terminal of the gating unit is electrically connected to a second terminal of the heating line.

First terminals of a plurality of heating lines electrically connected to the same gating unit are electrically connected to the same first type of heating signal output terminal.

The preceding is the core idea of the present application. Technical solutions in embodiments of the present disclosure are described clearly and completely below in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art without creative work are within the scope of the present disclosure.

Figure 2:
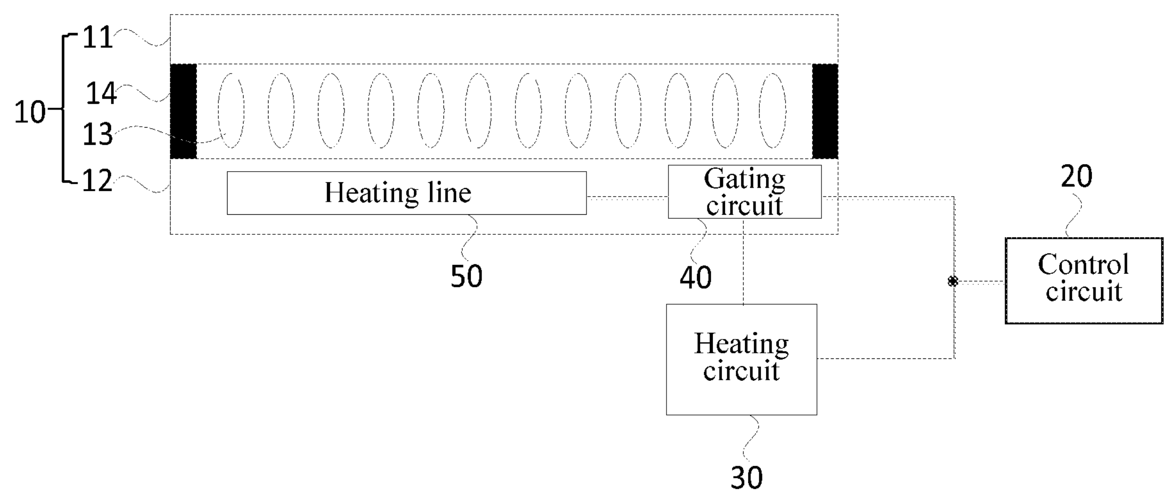
FIG. 2 is a schematic structure diagram of another display module according to an embodiment of the present disclosure.
Figure 3:
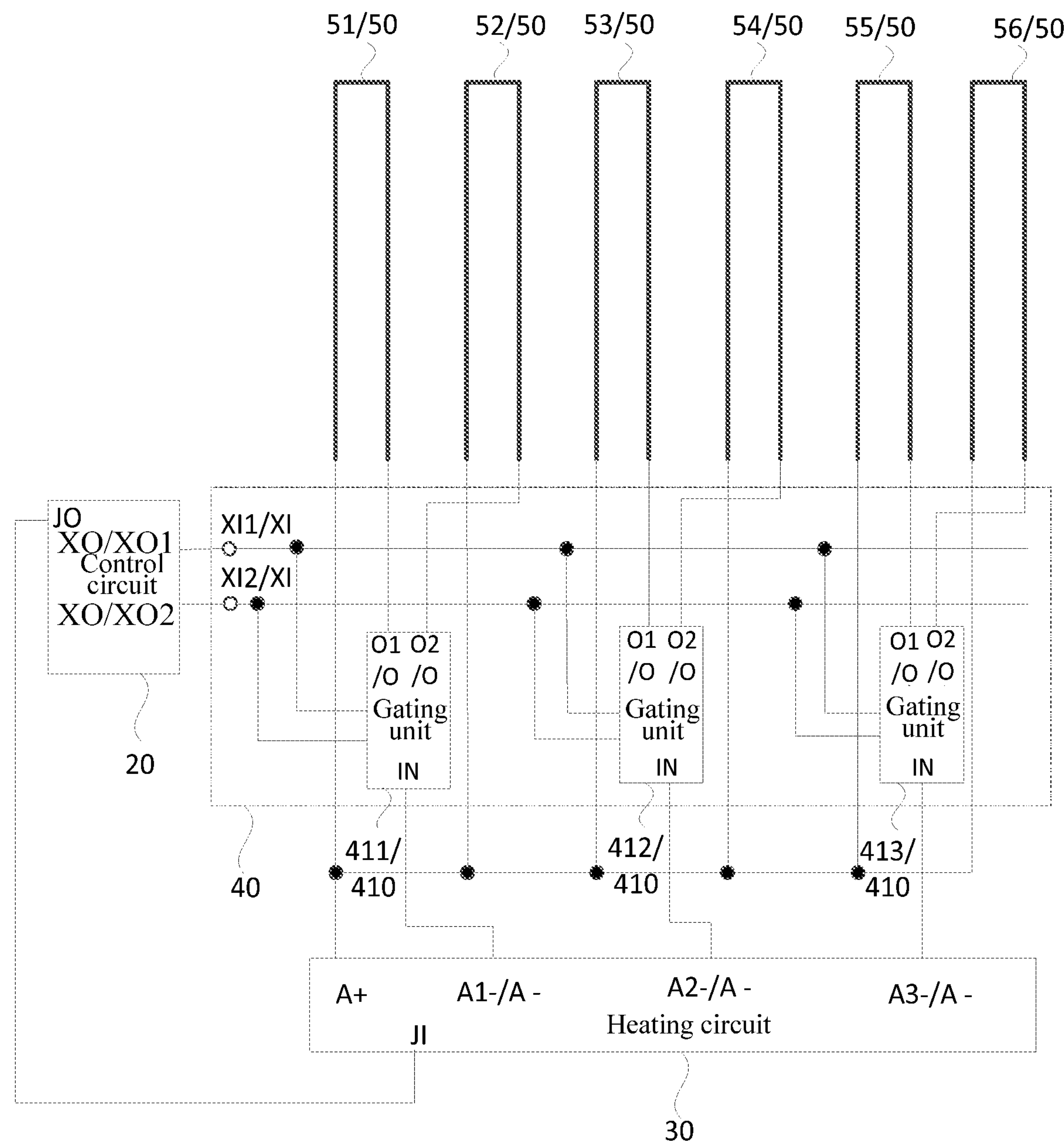
FIG. 3 is a schematic diagram of a connection structure of heating lines, a gating circuit, a heating circuit and a control circuit according to an embodiment of the present disclosure.
Figure 4:
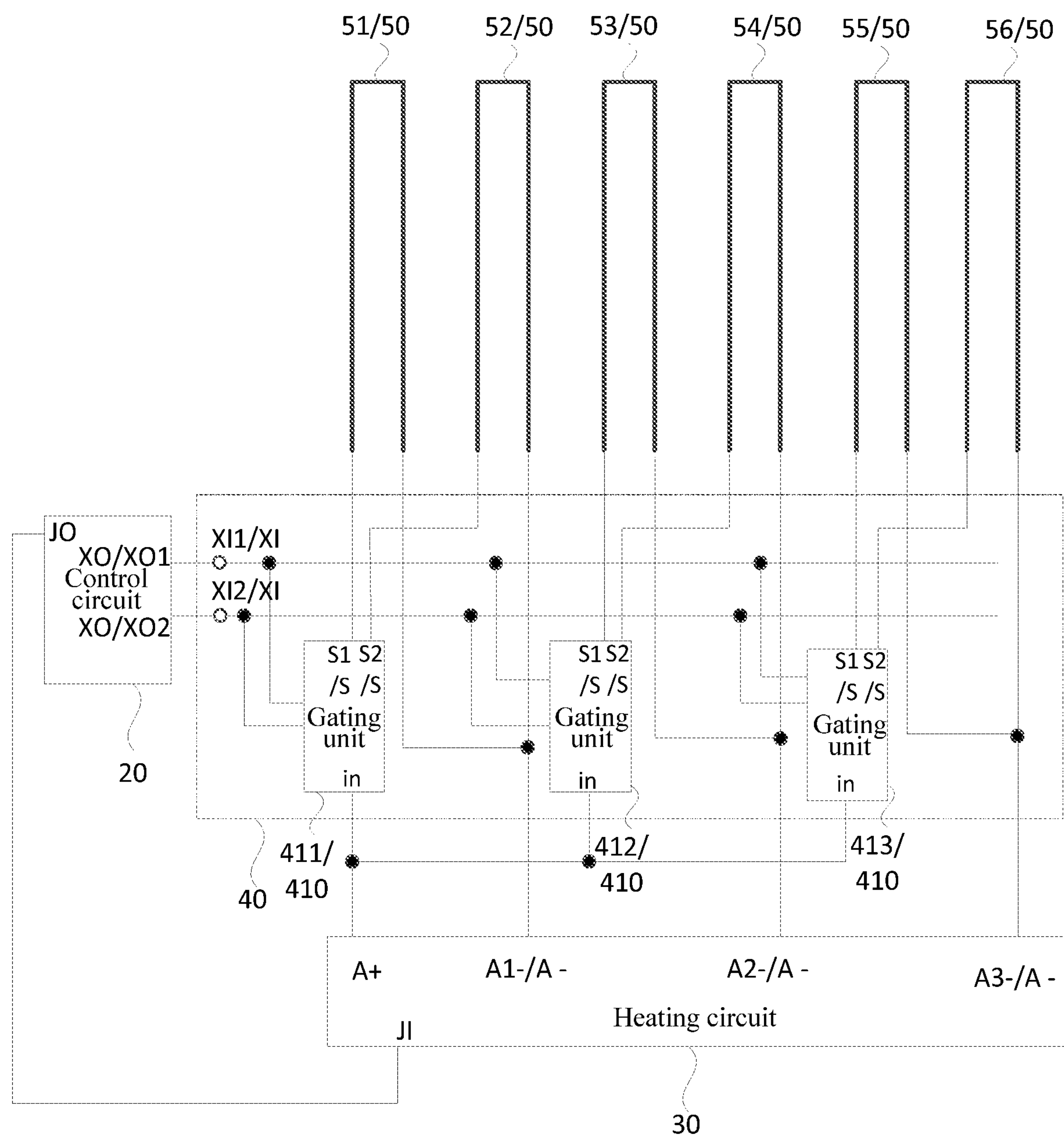
FIG. 4 is a schematic diagram of another connection structure of heating lines, a gating circuit, a heating circuit and a control circuit according to an embodiment of the present disclosure.
Figure 5:
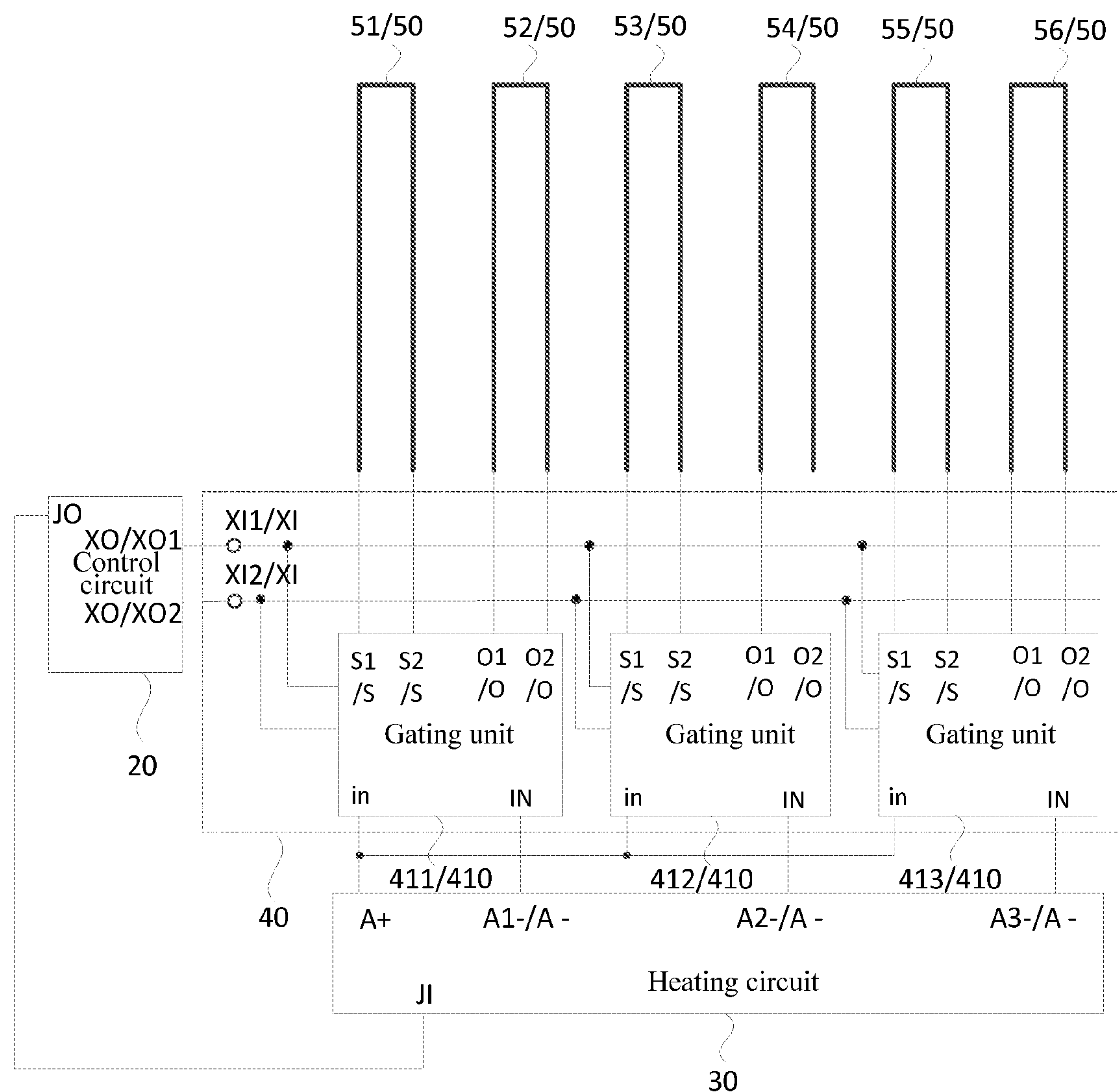
FIG. 5 is a schematic diagram of another connection structure of heating lines, a gating circuit, a heating circuit and a control circuit according to an embodiment of the present disclosure.

FIG. 1 is a schematic structure diagram of a display module according to an embodiment of the present disclosure. FIG. 2 is a schematic structure diagram of another display module according to an embodiment of the present disclosure. FIG. 3 is a schematic diagram of a connection structure of heating lines, a gating circuit, a heating circuit and a control circuit according to an embodiment of the present disclosure. FIG. 4 is a schematic diagram of another connection structure of heating lines, a gating circuit, a heating circuit and a control circuit according to an embodiment of the present disclosure. FIG. 5 is a schematic diagram of another connection structure of heating lines, a gating circuit, a heating circuit and a control circuit according to an embodiment of the present disclosure. The difference between FIG. 1 and FIG. 2 and the differences between FIG. 2, FIG. 3, FIG. 4 and FIG. 5 lie in the specific connection mode of the heating circuit 30, the gating circuit 40 and the plurality of heating lines 50. Referring to FIG. 1 to FIG. 5, a display module includes a display panel 10, a control circuit 20, a heating circuit 30, a gating circuit 40, and a plurality of heating lines 50. The heating circuit 30 includes at least one first type of heating signal output terminal A− and at least one second type of heating signal output terminal A+. The gating circuit 40 includes at least one gating unit 410, a gating signal output terminal XO of the control circuit 20 is electrically connected to a gating signal input terminal XI of the gating circuit 40, and the heating control signal output terminal JO of the control circuit 20 is electrically connected to the heating control signal input terminal JI of the heating circuit 30. The heating circuit 30 and the gating circuit 40 comprise at least one of the following connection modes: a first type of heating signal output terminal A− is electrically connected to a first type of signal input terminal IN of a gating unit 410, and a first type of signal output terminal O of the gating unit is electrically connected to the first terminal of a heating line 50; or a second type of heating signal output terminal A+ is electrically connected to a second type of signal input terminal in of the gating unit 410, and a second type of signal output terminal S of the gating unit 410 is electrically connected to the second terminal of the heating line 50. First terminals of a plurality of heating lines 50 electrically connected to a same gating unit 410 are electrically connected to a same first type of heating signal output terminal A−.

Specifically, the display panel 10 includes a liquid crystal display panel or other panels that need heating as known to those skilled in the art. For convenience of explanation, a liquid crystal display panel 10 will be described below as an example. With continued reference to FIG. 1, the liquid crystal display panel 10 includes an array substrate 11 and a color filter substrate 12 disposed opposite each other, and the array substrate 11 and the color filter substrate 12 are bonded by adhesive frames 14 to form a liquid crystal cell in which liquid crystals 13 are filled.

Specifically, the control circuit 20 includes at least one heating control signal output terminal JO for sending a heating control signal, the heating circuit 30 includes at least one heating control signal input terminal JI for receiving the heating control signal, and the heating control signal output terminal JO is correspondingly electrically connected to the heating control signal input terminal JI. The heating circuit 30 is configured to generate a heating signal based on the heating control signal. It is to be noted that FIG. 3 to FIG. 5 merely exemplarily illustrate that the control circuit 20 includes one heating control signal output terminal JO and that the heating circuit 30 includes one heating control signal input terminal JI, but the embodiments of the present disclosure are not limited thereto, and the number of terminals described above may be set by those skilled in the art according to the actual situation.

Specifically, the control circuit 20 further includes a plurality of gating signal output terminals XO for outputting gating signals, the gating circuit 40 includes a plurality of gating signal input terminals XI for receiving the gating signals, and a gating signal output terminal XO is correspondingly electrically connected to a gating signal input terminal XI. Each gating unit 410 in the gating circuit 40 is turned on in response to the turn-on level of a gating signal and turned off in response to the turn-off level of the gating signal. It is to be noted that FIG. 3 to FIG. 5 merely exemplarily illustrate that the control circuit 20 includes two gating signal output terminals XO and that the gating circuit 40 includes two gating signal input terminals XI, but the embodiments of the present disclosure are not limited thereto, and the number of terminals described above may be set by those skilled in the art according to the actual situation.

Specifically, the heating circuit 30 includes at least one first type of heating signal output terminal A− and at least one second type of heating signal output terminal A+. Of the first type of heating signal output terminal A− and the second type of heating signal output terminal A+, one is the positive output terminal and the other is the negative output terminal. For convenience of explanation, the first type of heating signal output terminal A− as the negative output terminal and the second type of heating signal output terminal A+ as the positive output terminal will be used as an example for explanation hereinafter. The heating signal generated by the heating circuit 30 in response to the heating control signal is output through the first type of heating signal output terminal A− and the second type of heating signal output terminal A+. It is to be noted that FIG. 3 to FIG. 5 merely exemplarily illustrate that the heating circuit 30 includes three first type of heating signal output terminal A− and one second type of heating signal output terminal A+, but the embodiments of the present disclosure are not limited thereto, and the number of terminals described above may be set by those skilled in the art according to the actual situation.

Specifically, the heating circuit 30 provides a heating signal for a heating line 50 such that the heating line 50 heats the display panel 10. Such principle is as described below. For each heating line 50, a heating loop is formed between a heating line 50 and the heating circuit 30 when the first type of heating signal output terminal A− of the heating circuit 30 is electrically conductive to the first terminal of the heating line 50 and when the second type of heating signal output terminal A+ of the heating circuit 30 is electrically conductive to the second terminal of the heating line 50. The heating circuit 30 provides a heating signal for the heating line 50 through the first type of heating signal output terminal and the second type of heating signal output terminal, and the heating line 50 generates heat in response to the heating signal to heat the display panel 10. Whether the heating loop can be formed between the heating circuit 30 and the heating line 50 depends on whether the gating unit 410 between the heating circuit 30 and the heating line 50 is turned on or off. It is be noted that the specific implementation of the heating signal is related to the specific implementation of the heating circuit 30, may be set by those skilled in the art according to the actual situation and is not limited herein. Exemplarily, the heating circuit 30 may include a boost chopper (abbreviated as a BOOST circuit), and the current value of the heating signal output by the BOOST circuit may be in the range of 0 mA to 40 mA.

Specifically, the gating unit 410 may be disposed at various specific positions in the heating loop of the heating line, and typical examples will be described below.

Type one: A first type of heating signal output terminal A− is electrically connected to a first type of signal input terminal IN of a gating unit 410, a first type of signal output terminal O of the gating unit 410 is electrically connected to the first terminal of a heating line 50, the first terminals of a plurality of heating lines 50 electrically connected to the same gating unit 410 are electrically connected to the same first type of heating signal output terminal A−, and the second terminals of heating lines 50 are electrically connected to a second type of heating signal output terminal A+.

Specifically, the first type of heating signal output terminal A− is correspondingly electrically connected to the first type of signal input terminal IN, and the first type of signal output terminal O is correspondingly electrically connected to the first terminal of the heating line 50. A signal output from a first type of heating signal output terminal A− is selectively transmitted to the first terminal of one of the heating lines 50 through a gating unit 410 electrically connected to the first type of heating signal output terminal A−. Thus, for the plurality of heating lines 50 electrically connected to the same first type of heating signal output terminal A−, the heating signals output from the first type of heating signal output terminal A− and the second type of heating signal output terminal A+ can be transmitted to each of the plurality of heating lines 50 through the gating unit 410 in a time-sharing manner.

Exemplarily, with continued reference to FIG. 3, the first type of heating signal output terminal A1− is electrically connected to the first type of signal input terminal IN of the gating unit 411, the first type of signal output terminal O1 of the gating unit 411 is electrically connected to the first terminal of the heating line 51, and the first type of signal output terminal O2 of the gating unit 411 is electrically connected to the first terminal of the heating line 52; the first type of heating signal output terminal A2− is electrically connected to the first type of signal input terminal IN of the gating unit 412, the first type of signal output terminal O1 of the gating unit 412 is electrically connected to the first terminal of the heating line 53, and the first type of signal output terminal O2 of the gating unit 412 is electrically connected to the first terminal of the heating line 54; and the first type of heating signal output terminal A3− is electrically connected to the first type of signal input terminal IN of the gating unit 413, the first type of signal output terminal O1 of the gating unit 413 is electrically connected to the first terminal of the heating line 55, and the first type of signal output terminal O2 of the gating unit 413 is electrically connected to the first terminal of the heating line 56. The second terminal of each heating line 50 is electrically connected to the second type of heating signal output terminal A+. The gating signal input terminal XI1 is electrically connected to the gating signal output terminal XO1, and the gating signal input terminal XI2 is electrically connected to the gating signal output terminal XO2. Thus, when the gating signal input terminal XI1 receives the turn-on level and the gating signal input terminal XI2 receives the turn-off level, the heating signal output between the first type of heating signal output terminal A1− and the second type of heating signal output terminal A+ is transmitted to the heating line 51, the heating signal output between the first type of heating signal output terminal A2− and the second type of heating signal output terminal A+ is transmitted to the heating line 53, and the heating signal output between the first type of heating signal output terminal A3− and the second type of heating signal output terminal A+ is transmitted to the heating line 55. Then, the heating line 51, the heating line 53, and the heating line 55 generate heat in response to the respective received heating signals to heat the display panel 10. When the gating signal input terminal XI1 receives the turn-off level and the gating signal input terminal XI2 receives the turn-on level, the heating signal output between the first type of heating signal output terminal A1− and the second type of heating signal output terminal A+ is transmitted to the heating line 52, the heating signal output between the first type of heating signal output terminal A2− and the second type of heating signal output terminal A+ is transmitted to the heating line 54, and the heating signal output between the first type of heating signal output terminal A3- and the second type of heating signal output terminal A+ is transmitted to the heating line 56. Then, the heating line 52, the heating line 54, and the heating line 56 generate heat in response to the respective received heating signals to heat the display panel 10.

Type two: A second type of heating signal output terminal A+ is electrically connected to a second type of signal input terminal in of a gating unit 410, and a second type of signal output terminal S of the gating unit 410 is electrically connected to the second terminal of a heating line 50; first terminals of heating lines 50 electrically connected to a same gating unit 410 are electrically connected to a same first type of heating signal output terminal A−.

Specifically, a second type of heating signal output terminal A+ may be correspondingly electrically connected to a second type of signal input terminal in of a gating unit 410, and the second type of signal input terminals in of the gating units 410 may also be electrically connected to the same second type of heating signal output terminal A+(as shown in FIG. 4), which is not limited herein. A second type of signal output terminal S is correspondingly electrically connected to the second terminal of a heating line 50. A signal output from a second type of heating signal output terminal A+ is selectively transmitted to the second terminal of one of the heating lines 50 through a gating unit 410 electrically connected to the second type of heating signal output terminal A+. Thus, for the plurality of heating lines 50 electrically connected to the same first type of heating signal output terminal A−, the heating signals output from the first type of heating signal output terminal A− and the second type of heating signal output terminal A+ can be transmitted to each of the plurality of heating lines 50 through the gating unit 410 in a time-sharing manner.

Exemplarily, with continued reference to FIG. 4, the second type of signal input terminal in of the gating unit 411, the second type of signal input terminal in of the gating unit 412, and the second type of signal input terminal in of the gating unit 413 are electrically connected to the same second type of heating signal output terminal A+. The second type of signal output terminal S1 of the gating unit 411 is electrically connected to the second terminal of the heating line 51, the second type of signal output terminal S2 of the gating unit 411 is electrically connected to the second terminal of the heating line 52, and the first terminal of the heating line 51 and the first terminal of the heating line 52 are each electrically connected to the first type of heating signal output terminal A1−. The second type of signal output terminal S1 of the gating unit 412 is electrically connected to the second terminal of the heating line 53, the second type of signal output terminal S2 of the gating unit 413 is electrically connected to the second terminal of the heating line 54, and the first terminal of the heating line 53 and the first terminal of the heating line 54 are each electrically connected to the first type of heating signal output terminal A2−. The second type of signal output terminal S1 of the gating unit 413 is electrically connected to the second terminal of the heating line 55, the second type of signal output terminal S2 of the gating unit 413 is electrically connected to the second terminal of the heating line 56, and the first terminal of the heating line 55 and the first terminal of the heating line 56 are each electrically connected to the first type of heating signal output terminal A3−. The gating signal input terminal XI1 is electrically connected to the gating signal output terminal XO1, and the gating signal input terminal XI2 is electrically connected to the gating signal output terminal XO2. Thus, when the gating signal input terminal XI1 receives the turn-on level and the gating signal input terminal XI2 receives the turn-off level, the heating line 51, the heating line 53, and the heating line 55 generate heat in response to the respective received heating signals to heat the display panel 10. When the gating signal input terminal XI1 receives the turn-off level and the gating signal input terminal XI2 receives the turn-on level, the heating line 52, the heating line 54, and the heating line 56 generate heat in response to the respective received heating signals to heat the display panel 10.

Type three: A first type of heating signal output terminal A− is electrically connected to a first type of signal input terminal IN of a gating unit 410, and a first type of signal output terminal O of the gating unit is electrically connected to the first terminal of a heating line 50; and a second type of heating signal output terminal A+ is electrically connected to a second type of signal input terminal in of the gating unit 410, and a second type of signal output terminal S of the gating unit 410 is electrically connected to the second terminal of the heating line 50; and first terminals of heating lines 50 electrically connected to a same gating unit 410 are electrically connected to a same first type of heating signal output terminal A−.

Exemplarily, as shown in FIG. 5, when the gating signal input terminal XI1 receives the turn-on level and the gating signal input terminal XI2 receives the turn-off level, the heating line 51, the heating line 53, and the heating line 55 generate heat in response to the respective received heating signals to heat the display panel 10. When the gating signal input terminal XI1 receives the turn-off level and the gating signal input terminal XI2 receives the turn-on level, the heating line 52, the heating line 54, and the heating line 56 generate heat in response to the respective received heating signals to heat the display panel 10. It is to be noted that for the specific connection of the heating circuit 30, the gating circuit, and the heating lines in FIG. 5, reference can be made to FIG. 3 and FIG. 4, and repetition is not made here.

It may be understood that when the heating lines 50, the gating circuit 40, the heating circuit 30 and the control circuit 20 are connected as shown in FIG. 1, FIG. 3 and FIG. 4, the gating unit 410 is merely electrically connected to the first terminal of a heating line 50 or the second terminal of the heating line 50, which can simplify the structure of the gating unit 410 and is conducive to reducing the cost of the gating unit 410.

It may also be understood that when the second terminals of all heating lines 50 are connected to the same second type of heating signal output terminal A+ directly (as shown in FIG. 3) or through the gating circuits 40 (as shown in FIG. 4 and FIG. 5), merely one second type of heating signal output terminal A+ is required to be provided on the heating circuit 30 to satisfy the design requirements, conducive to reducing the occupation of pins in the heating circuit 30 in number and further to reducing the cost of the heating circuit 30.

It is to be noted that FIG. 3 to FIG. 5 merely exemplarily illustrate that the heating circuit 30 includes one heating control signal input terminal JI. Thus, the heating signal output from the first type of heating signal output terminal A1− and the second type of heating signal output terminal A+, the heating signal output from the first type of heating signal output terminal A2− and the second type of heating signal output terminal A+, and the heating signal output from the first type of heating signal output terminal A3− and the second type of heating signal output terminal A+ are all generated according to the heating control signals input from the same heating control signal input terminal JI, but the present application is not limited thereto. The number of heating control signal input terminals JI in the heating circuit 30 may be set by those skilled in the art according to the actual situation. Exemplarily, in other embodiments, heating control signal input terminals JI may be in one-to one correspondence with first type of heating signal output terminals A− in the heating circuit 30. Thus, each heating signal output from the first type of heating signal output terminal A1− and the second type of heating signal output terminal A+ can be generated according to a heating control signal input from the heating control signal input terminal JI corresponding to the first type of heating signal output terminal A1−.

It is also to be noted that the specific positions of the control circuit 20, the heating circuit 30, the gating circuit 40, and the heating lines 50 may be set by those skilled in the art according to the actual situation and are not limited herein. Explanation is not provided here and typical examples will be described in detail below.

According to the display module provided in the embodiments of the present disclosure, the display module includes the control circuit, the gating circuit, the heating circuit and the plurality of heating lines. The control circuit controls the level state (turn-on level or turn-off level) of each gating signal sent to the gating circuit such that the heating circuit can provide heating signals for a plurality of heating lines in a time-sharing manner. Furthermore, the plurality of heating lines provides heat for the display panel in the display module in the time-sharing manner, solving the problem, in the related art, of an increase in the number of heating circuits or in the design difficulty caused by an increase in the number of heating lines, and achieving the effects of not increasing the number of heating circuits and of reducing the cost of the display module.

Specifically, the gating circuit 40, the heating circuit 30, and the control circuit 20 may be implemented in various ways. Exemplarily, the heating circuit 30 may include a BOOST circuit. For the specific implementation of the boost chopper circuit, reference can be made by those skilled in the art to the related art and repetition is not made here. Exemplarily, the control circuit 20 may include a microprocessor such as a single-chip microcomputer. A typical example of the gating circuit 40 will be described in detail below but is not intended to limit the present application.

Figure 6:
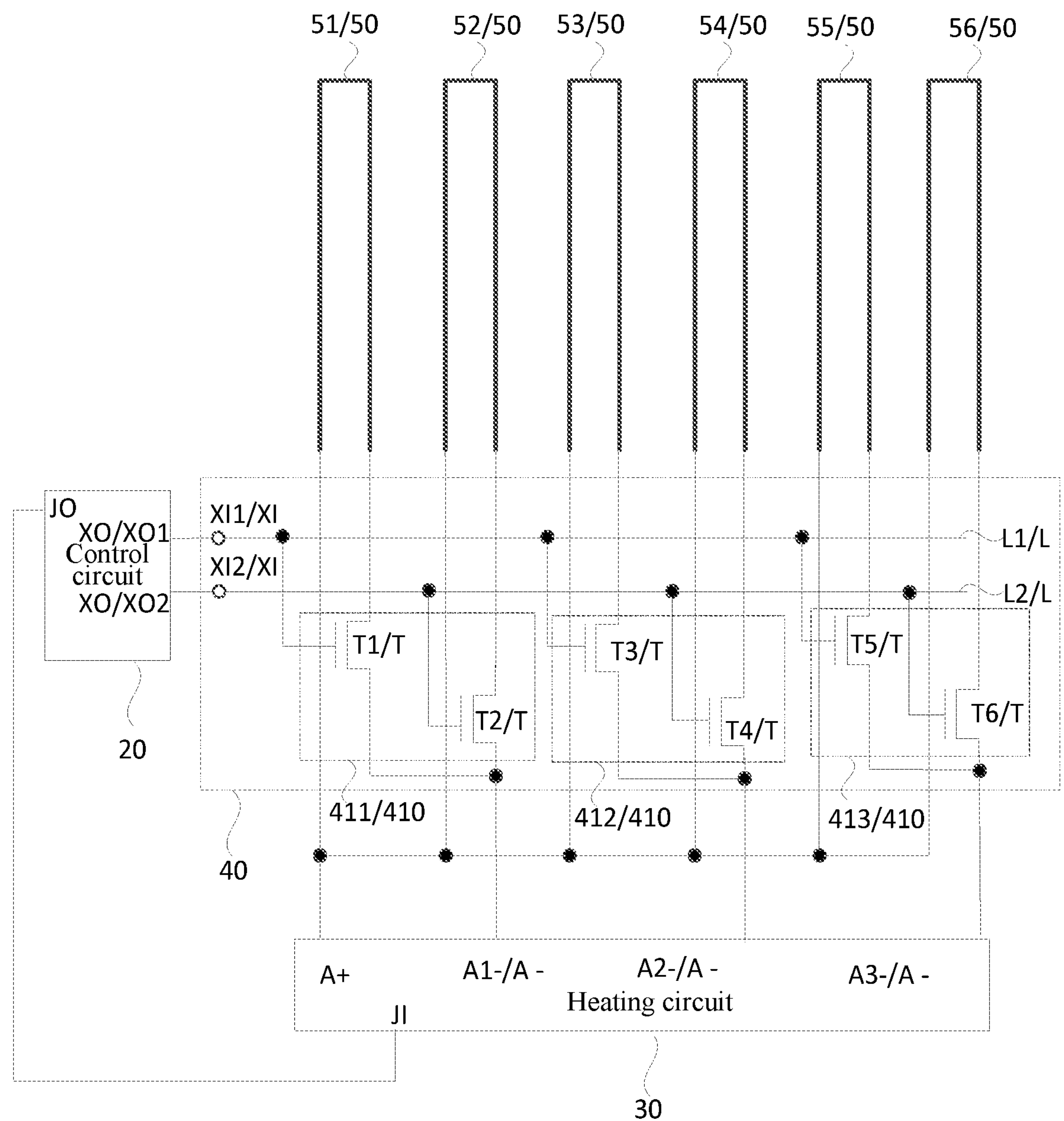
FIG. 6 is a schematic diagram of circuit elements of a gating circuit according to an embodiment of the present disclosure.

FIG. 6 is a schematic diagram of circuit elements of a gating circuit according to an embodiment of the present disclosure. Referring to FIG. 6, first type of heating signal output terminals A− are electrically connected to first type of signal input terminals IN of the gating circuit 40, and first type of signal output terminals O of the gating circuit 40 are electrically connected to first terminals of heating lines 50. The gating circuit 40 includes a plurality of first thin-film transistors T and a plurality of gating signal lines L, and a gating signal line L is electrically connected to a gating output terminal XO of the control circuit 20. All first thin-film transistors T are electrically connected to first terminals of respective heating lines, and first thin-film transistors T in the same gating unit 410 correspond to one preset trace and are electrically connected to the same first type of heating signal output terminal A−. The first thin-film transistors T in the same gating unit 410 have drains being electrically connected to first terminals of corresponding heating lines, sources corresponding to the one preset trace and being electrically connected to the first type of heating signal output terminal A−, and gates being electrically connected to different gating signal lines L. In an embodiment, second terminals of all heating lines 50 are electrically connected to a same second type of heating signal output terminal A+.

Exemplarily, with continued reference to FIG. 6, the source of the first thin-film transistor T1 and the source of the first thin-film transistor T2 in the gating unit 411 are electrically connected to the first type of heating signal output terminal A1− through a same preset trace, the drain of the first thin-film transistor T1 is electrically connected to the first terminal of the heating line 51, the drain of the first thin-film transistor T2 is electrically connected to the first terminal of the heating line 52, the gate of the first thin-film transistor T1 is electrically connected to the gating signal line L1, and the gate of the first thin-film transistor T2 is electrically connected to the gating signal line L2. The source of the first thin-film transistor T3 and the source of the first thin-film transistor T4 in the gating unit 412 are electrically connected to the first type of heating signal output terminal A2− through a same preset trace, the drain of the first thin-film transistor T3 is electrically connected to the first terminal of the heating line 53, the drain of the first thin-film transistor T4 is electrically connected to the first terminal of the heating line 54, the gate of the first thin-film transistor T3 is electrically connected to the gating signal line L1, and the gate of the first thin-film transistor T4 is electrically connected to the gating signal line L2. The source of the first thin-film transistor T5 and the source of the first thin-film transistor T6 in the gating unit 413 are electrically connected to the first type of heating signal output terminal A3− through a same preset trace, the drain of the first thin-film transistor T5 is electrically connected to the first terminal of the heating line 55, the drain of the first thin-film transistor T6 is electrically connected to the first terminal of the heating line 56, the gate of the first thin-film transistor T5 is electrically connected to the gating signal line L1, and the gate of the first thin-film transistor T6 is electrically connected to the gating signal line L2. Second terminals of all heating lines 50 are electrically connected to a same second type of heating signal output terminal A+. The gating signal line L1 is electrically connected to the gating signal output terminal XO1, and the gating signal line L2 is electrically connected to the gating signal output terminal XO2. Thus, when the turn-on level is transmitted on the gating signal line L1 and the turn-off level is transmitted on the gating signal line L2, the heating signal output between the first type of heating signal output terminal A1− and the second type of heating signal output terminal A+ is transmitted to the heating line 51 through the first thin-film transistor T1 turned on, the heating signal output between the first type of heating signal output terminal A2− and the second type of heating signal output terminal A+ is transmitted to the heating line 53 through the first thin-film transistor T3 turned on, and the heating signal output between the first type of heating signal output terminal A3− and the second type of heating signal output terminal A+ is transmitted to the heating line 55 through the first thin-film transistor T5 turned on. Then, the heating line 51, the heating line 53, and the heating line 55 generate heat in response to the respective received heating signals to heat the display panel 10. When the turn-off level is transmitted on the gating signal line L1 and the turn-on level is transmitted on the gating signal line L2, the first thin-film transistor T2, the first thin-film transistor T4, and the first thin-film transistor T6 are turned on. Then, the heating line 52, the heating line 54, and the heating line 56 generate heat in response to the respective received heating signals to heat the display panel 10.

Figure 7:
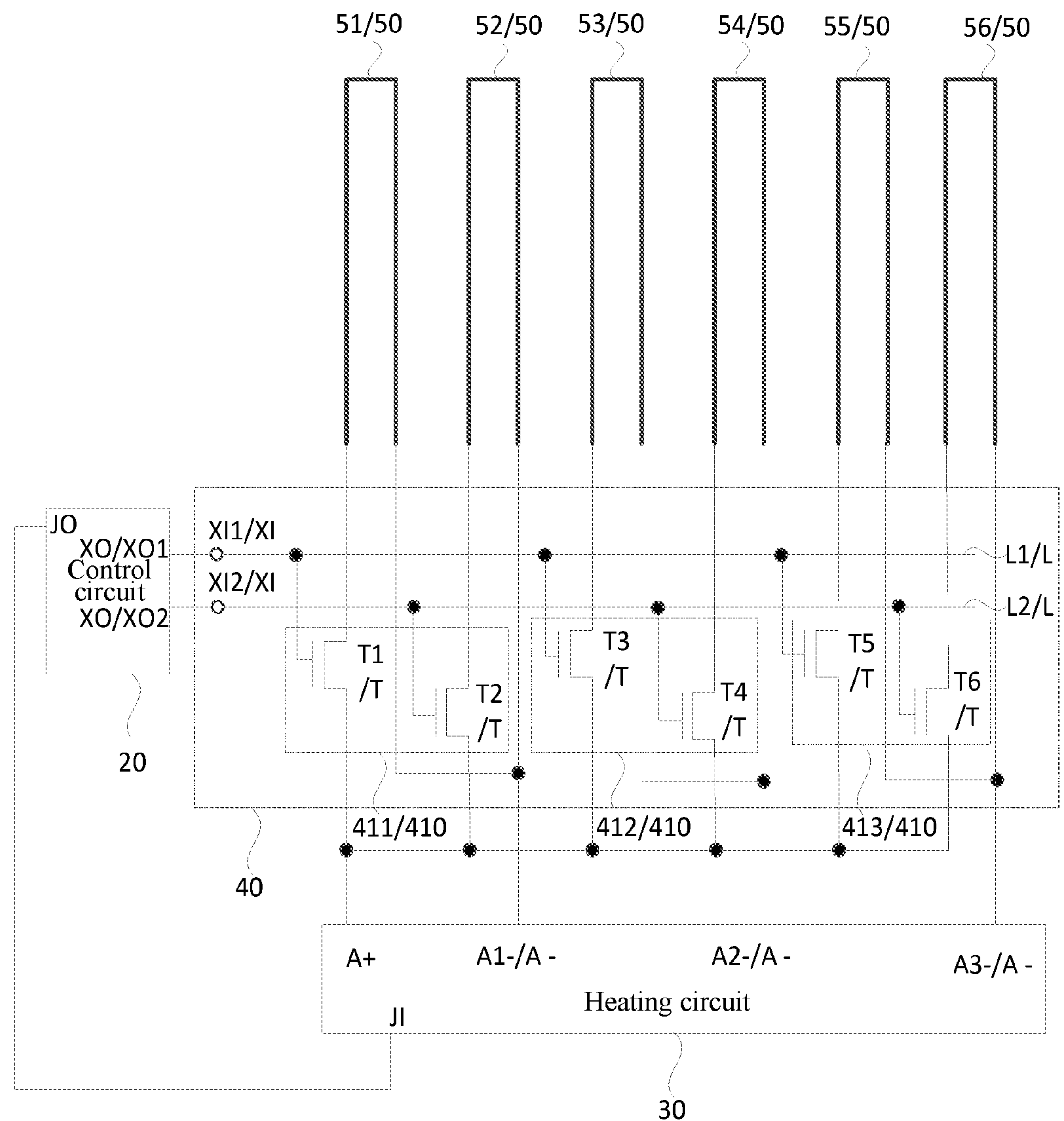
FIG. 7 is a schematic diagram of circuit elements of another gating circuit according to an embodiment of the present disclosure.

FIG. 7 is a schematic diagram of circuit elements of another gating circuit according to an embodiment of the present disclosure. Referring to FIG. 7, the second type of heating signal output terminal A+ is electrically connected to second type of signal input terminals in of the gating circuit 40, second type of signal output terminals S of the gating circuit 40 are electrically connected to second terminals of the heating lines 50, and gating signal lines are electrically connected to gating output terminals XO of the control circuit 20. The gating circuit 40 includes a plurality of first thin-film transistors T and a plurality of gating signal lines L, and a gating signal line is electrically connected to a gating output terminal XO of the control circuit. All first thin-film transistors T are electrically connected to second terminals of respective heating lines 50. First thin-film transistors T in the same gating unit 410 have drains being electrically connected to second terminals of corresponding heating lines 50, sources being electrically connected to the second type of heating signal output terminal A+, and gates being electrically connected to different gating signal lines. In an embodiment, the second terminals of all heating lines 50 are electrically connected to the same second type of heating signal output terminal A+, and specifically, the second type of signal input terminals in of all gating units are electrically connected to the same second type of heating signal output terminal A+.

Exemplarily, with continued reference to FIG. 7, the source of the first thin-film transistor T1 and the source of the first thin-film transistor T2 in the gating unit 411, the source of the first thin-film transistor T3 and the source of the first thin-film transistor T4 in the gating unit 412, and the source of the first thin-film transistor T5 and the source of the first thin-film transistor T6 in the gating unit 413 are electrically connected to the second type of heating signal output terminal A+ through a same preset trace. In the gating unit 411, the drain of the first thin-film transistor T1 is electrically connected to the second terminal of the heating line 51, the gate of the first thin-film transistor T1 is electrically connected to the gating signal line L1, the drain of the first thin-film transistor T2 is electrically connected to the second terminal of the heating line 52, the gate of the first thin-film transistor T2 is electrically connected to the gating signal line L2, and the first terminal of the heating line 51 and the first terminal of the heating line 52 are electrically connected to the first type of heating signal output terminal A1− through a same preset trace. In the gating unit 412, the drain of the first thin-film transistor T3 is electrically connected to the second terminal of the heating line 53, the gate of the first thin-film transistor T3 is electrically connected to the gating signal line L1, the drain of the first thin-film transistor T4 is electrically connected to the second terminal of the heating line 54, the gate of the first thin-film transistor T4 is electrically connected to the gating signal line L2, and the first terminal of the heating line 53 and the first terminal of the heating line 54 are electrically connected to the first type of heating signal output terminal A2− through a same preset trace. In the gating unit 413, the drain of the first thin-film transistor T5 is electrically connected to the second terminal of the heating line 55, the gate of the first thin-film transistor T5 is electrically connected to the gating signal line L1, the drain of the first thin-film transistor T6 is electrically connected to the second terminal of the heating line 56, the gate of the first thin-film transistor T6 is electrically connected to the gating signal line L2, and the first terminal of the heating line 55 and the first terminal of the heating line 56 are electrically connected to the first type of heating signal output terminal A3− through a same preset trace. The gating signal line L1 is electrically connected to the gating signal output terminal XO1, and the gating signal line L2 is electrically connected to the gating signal output terminal XO2. Thus, when the turn-on level is transmitted on the gating signal line L1 and the turn-off level is transmitted on the gating signal line L2, the first thin-film transistor T1, the first thin-film transistor T3, and the first thin-film transistor T5 are turned on. Then, the heating line 51, the heating line 53, and the heating line 55 generate heat in response to the respective received heating signals to heat the display panel 10. When the turn-off level is transmitted on the gating signal line L1 and the turn-on level is transmitted on the gating signal line L2, the first thin-film transistor T2, the first thin-film transistor T4, and the first thin-film transistor T6 are turned on. Then, the heating line 52, the heating line 54, and the heating line 56 generate heat in response to the respective received heating signals to heat the display panel 10.

Figure 8:
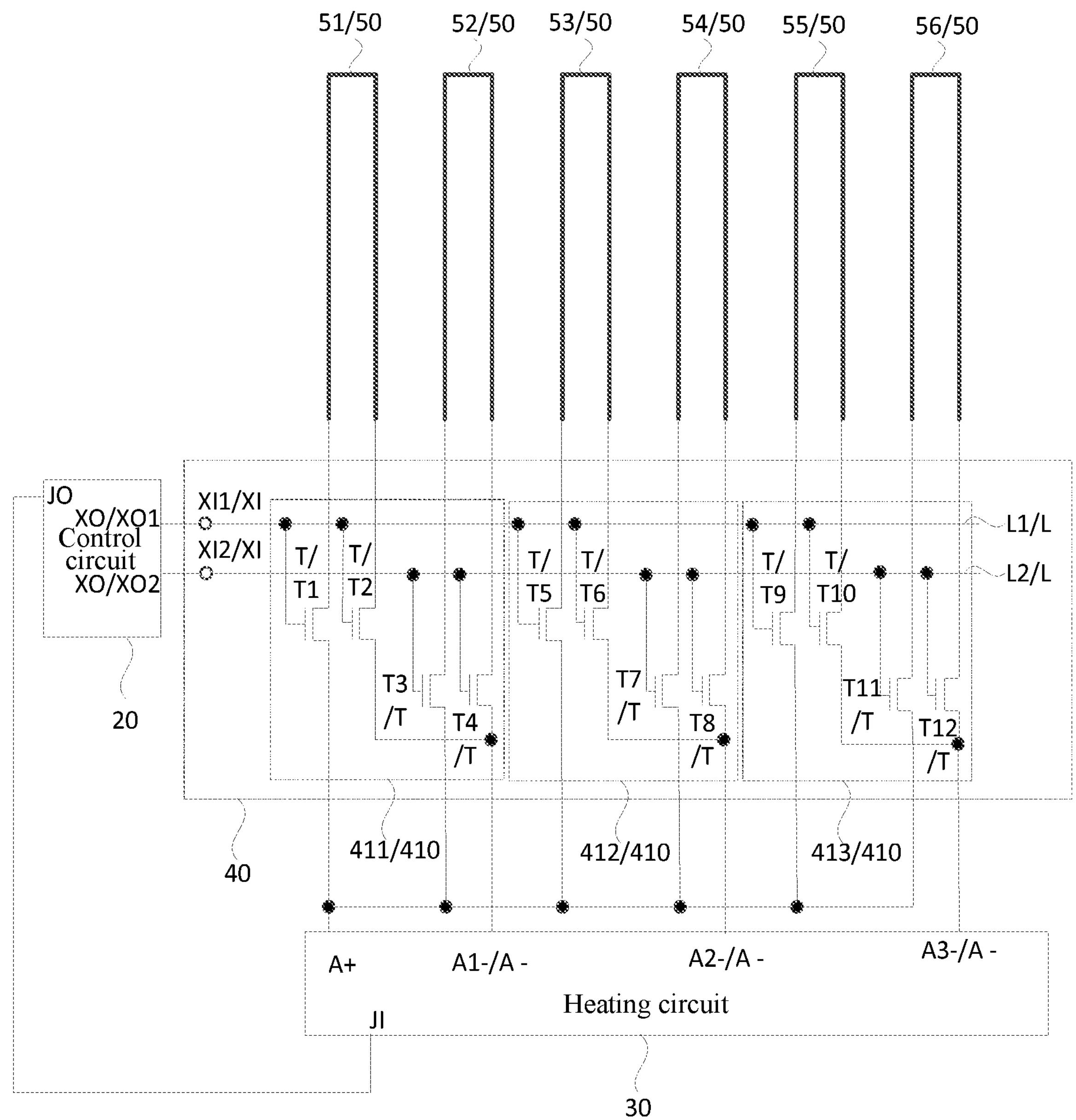
FIG. 8 is a schematic diagram of circuit elements of another gating circuit according to an embodiment of the present disclosure.

FIG. 8 is a schematic diagram of circuit elements of another gating circuit according to an embodiment of the present disclosure. Referring to FIG. 8, in an embodiment, first type of heating signal output terminals A− are electrically connected to first type of signal input terminals IN of the gating circuit 40, and first type of signal output terminals O of the gating circuit 40 are electrically connected to first terminals of heating lines 50; and a second type of heating signal output terminal A+ is electrically connected to second type of signal input terminals in of the gating circuit 40, and second type of signal output terminals S of the gating circuit 40 are electrically connected to second terminals of the heating lines 50; and the gating circuit 40 includes a plurality of first thin-film transistors T including a first type of thin-film transistor and a second type of thin-film transistor and includes a plurality of gating signal lines L electrically connected to gating output terminals XO of the control circuit 20. All first type of thin-film transistors are electrically connected to first terminals of respective heating lines 50, and first type of thin-film transistors in a same gating unit 410 correspond to one preset trace and are electrically connected to a same first type of heating signal output terminal A−. The first type of thin-film transistors in the same gating unit 410 have drains being electrically connected to first terminals of corresponding heating lines 50, sources corresponding to the one preset trace and being electrically connected to the first type of heating signal output terminal A−, and gates being electrically connected to different gating signal lines. All second type of thin-film transistors are electrically connected to second terminals of respective heating lines 50. Second type of thin-film transistors in the same gating unit 410 have drains being electrically connected to second terminals of corresponding heating lines 50, sources being electrically connected to the second type of heating signal output terminal A+, and gates being electrically connected to different gating signal lines. In an embodiment, the sources of all second type of thin-film transistors are electrically connected to the same second type of heating signal output terminal A+.

Exemplarily, with continued reference to FIG. 8, the first type of thin-film transistor includes the first thin-film transistor T2, the first thin-film transistor T4, the first thin-film transistor T6, the first thin-film transistor T8, the first thin-film transistor T10, and the first thin-film transistor T12; the second type of thin-film transistor includes the first thin-film transistor T1, the first thin-film transistor T3, the first thin-film transistor T5, the first thin-film transistor T7, the first thin-film transistor T9, and the first thin-film transistor T11. When the turn-on level is transmitted on the gating signal line L1 and the turn-off level is transmitted on the gating signal line L2, the first thin-film transistor T1, the first thin-film transistor T2, the first thin-film transistor T5, the first thin-film transistor T6, the first thin-film transistor T9, and the first thin-film transistor T10 are turned on. Then, the heating line 51, the heating line 53, and the heating line 55 generate heat in response to the respective received heating signals to heat the display panel 10. When the turn-off level is transmitted on the gating signal line L and the turn-on level is transmitted on the gating signal line L, the first thin-film transistor T3, the first thin-film transistor T4, the first thin-film transistor T7, the first thin-film transistor T8, the first thin-film transistor T11, and the first thin-film transistor T12 are turned on. Then, the heating line 52, the heating line 54, and the heating line 56 generate heat in response to the respective received heating signals to heat the display panel 10.

Specifically, the heating lines 50, the gating circuit 40 and the display panel 10 may have various relative positional relationships. Typical examples will be described below, but are not intended to limit the present application.

Figure 9:
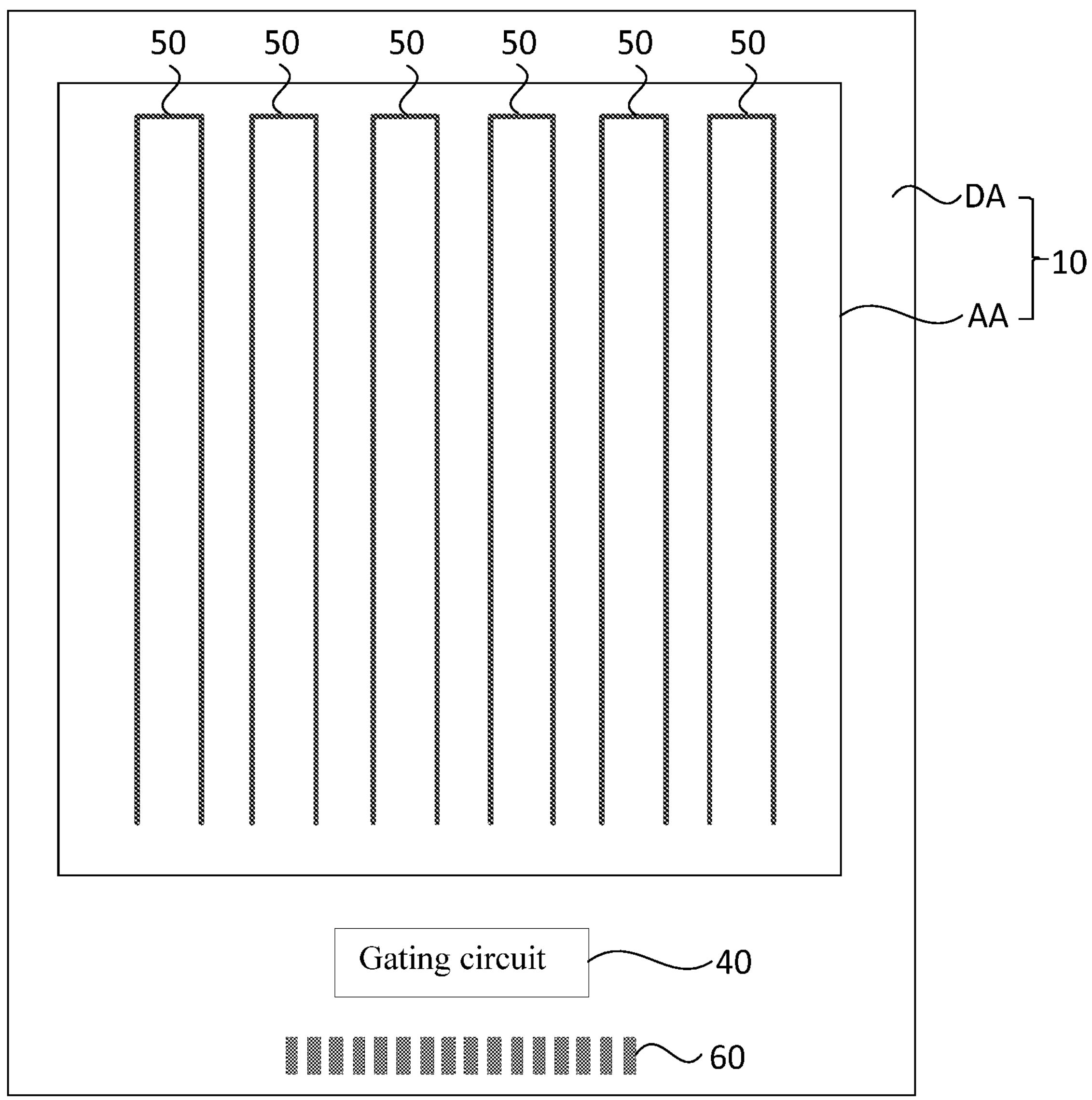
FIG. 9 is a schematic diagram showing a relative positional relationship of a display panel, heating lines and a gating circuit according to an embodiment of the present disclosure.

FIG. 9 is a schematic diagram of a relative positional relationship of a display panel, heating lines and a gating circuit according to an embodiment of the present disclosure. Referring to FIG. 1, FIG. 2 and FIG. 8, in an embodiment, the heating lines 50 and the gating unit 410 are both integrated within the display panel 10. It is to be noted that for convenience of drawing, FIG. 9 does not illustrate the specific connection mode of the heating lines 50 and the gating circuit 40. The connection between the heating lines 50 and the gating circuit 40 may be understood with reference to the preceding description and will not be repeated here.

Specifically, the display panel 10 includes a display area AA and a non-display area DA surrounding the display area AA. Since a liquid crystal is provided in the display area AA, the area of the display panel to be heated includes at least the display area AA. That is, at least the display area AA is provided with heating lines 50. The area of the display panel to be heated may be set according to the actual situation by those skilled in the art and is not limited herein. For convenience of explanation, the following description will use the heating lines 50 being disposed in the display area AA as an example. Specifically, the material of the heating line 50 may be a material having a high light transmittance, such as indium tin oxide, and is not limited herein. When the heating lines 50 are integrated in the display panel 10, a film layer may be added in the display panel 10 so as to form a plurality of heating lines 50, and the plurality of heating lines 50 may also be disposed in one of the existing film layers of the display panel 10. Such setting is not limited herein and may be provided according to the actual situation by those skilled in the art.

Specifically, the gating unit 410 may be disposed in the non-display area DA. In an embodiment, the first thin-film transistor T in the gating unit 410 may be formed by the same manufacturing process as the thin-film transistor in the array substrate, conducive to the reduction of the total cost of the display panel 10 and the gating circuit 40.

With continued reference to FIG. 9, a plurality of pads 60 may also be disposed on the side of the gating circuit 40 facing away from the display area AA, the heating lines 50 may be electrically connected to the heating circuit 30 through the pads, and the gating circuit 40 may be electrically connected to the heating circuit 30 and the control circuit 20 through the pads 60.

With continued reference to FIG. 9, in an embodiment, the first and second terminals of each heating line 50 receive signals from the same side. Thus, the connection between the heating lines 50 and the gating circuit 40 is facilitated, and the design difficulty of the connection between the heating lines 50 and the gating circuit 40 is reduced.

Figure 10:
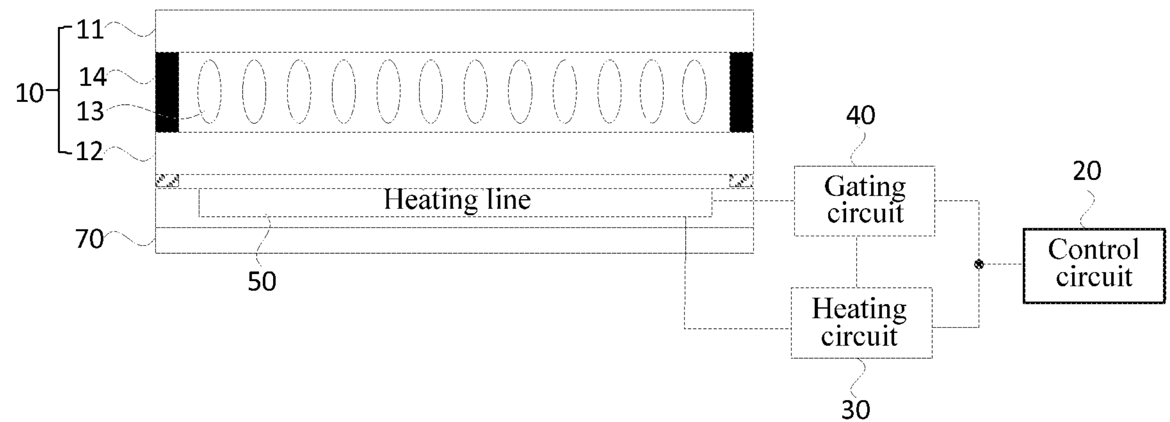
FIG. 10 is a schematic structure diagram of another display module according to an embodiment of the present disclosure.

FIG. 10 is a schematic structure diagram of another display module according to an embodiment of the present disclosure. Referring to FIG. 10, in an embodiment, the display module further includes a backlight module 70 disposed opposite the display panel 10, and the heating lines 50 are disposed on a side of the display panel 10 facing towards or facing away from the backlight module 70. The display module further includes a flexible circuit board and a printed circuit board (not shown in FIG. 10), and the gating units 410 are disposed on the flexible circuit board or the printed circuit board.

Specifically, the display module may further include a carrier substrate on which the heating lines 50 are disposed to form a heating plate, the heating plate is adhered to the display panel 10 through an adhesive tape, the carrier substrate may be provided with pads, and the heating lines 50 may be electrically connected to the gating circuit 40 and the heating circuit 30 through the pads.

Specifically, one end of the flexible circuit board may be bound to the display panel 10 through pads, and the other end of the flexible circuit board may be bound to the printed circuit board through pads, so as to implement signal interaction among the display panel 10, the flexible circuit board and the printed circuit board.

It may be understood that the heating lines 50 and the gating circuit 40 are disposed outside the display panel 10, facilitating replacement by a heating line 50 and a gating circuit 40 that can normally operate when the heating line 50 or the gating circuit 40 fails.

In an embodiment, the gating circuit 40 and the control circuit 20 are both disposed on the flexible circuit board or both disposed on the printed circuit board. Thus, the gating circuit 40 and the control circuit 20 may be electrically connected by a circuit on the flexible circuit board or on the printed circuit board, conducive to eliminating the connection process of the gating circuit 40 and the control circuit 20 and improving the assembly efficiency of the display module.

Figure 11:
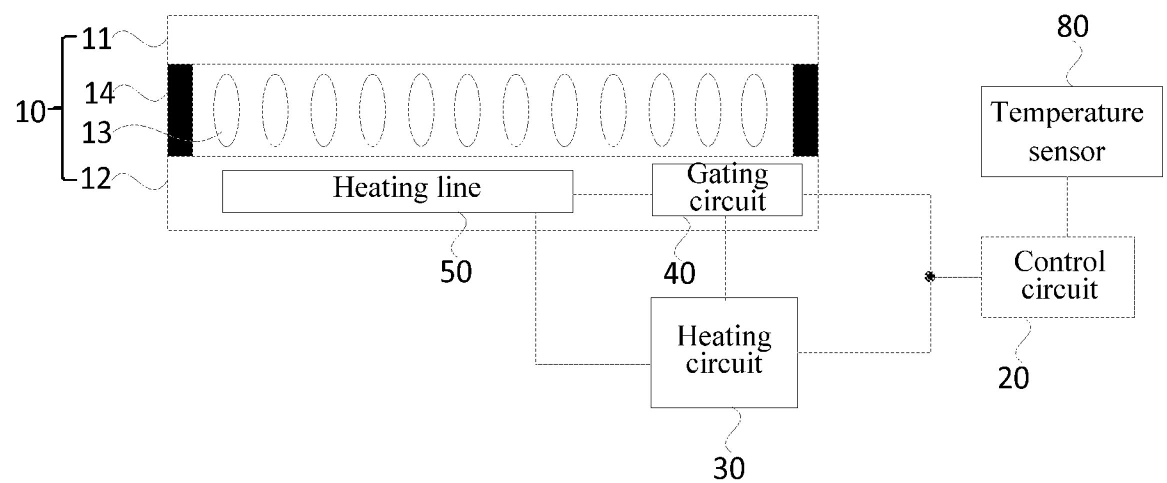
FIG. 11 is a schematic structure diagram of another display module according to an embodiment of the present disclosure.

FIG. 11 is a schematic structure diagram of another display module according to an embodiment of the present disclosure. Referring to FIG. 11, in an embodiment, a temperature sensor 80 is further included, and a temperature signal input terminal of the control circuit 20 is electrically connected to an output terminal of the temperature sensor 80.

Specifically, the temperature sensor 80 is configured to collect the temperature signal of the display panel 10 and transmit the temperature signal to the control circuit 20. The specific implementation and setting of the temperature sensor 80 may be set according to the actual situation by those skilled in the art and are not limited herein. Exemplarily, the temperature sensor 80 may include a Wheatstone bridge disposed in the display area AA.

It may be understood that the temperature sensor 80 is configured to collect the temperature signal of the display panel 10 such that the control circuit 20 can adjust the heating control signal according to the temperature signal in real time, and further, the heating circuit 30 can adjust the heating signal according to the heating control signal, so as to achieve the effect of heating the display panel 10 to a preset temperature through the heating line 50.

Figure 12:
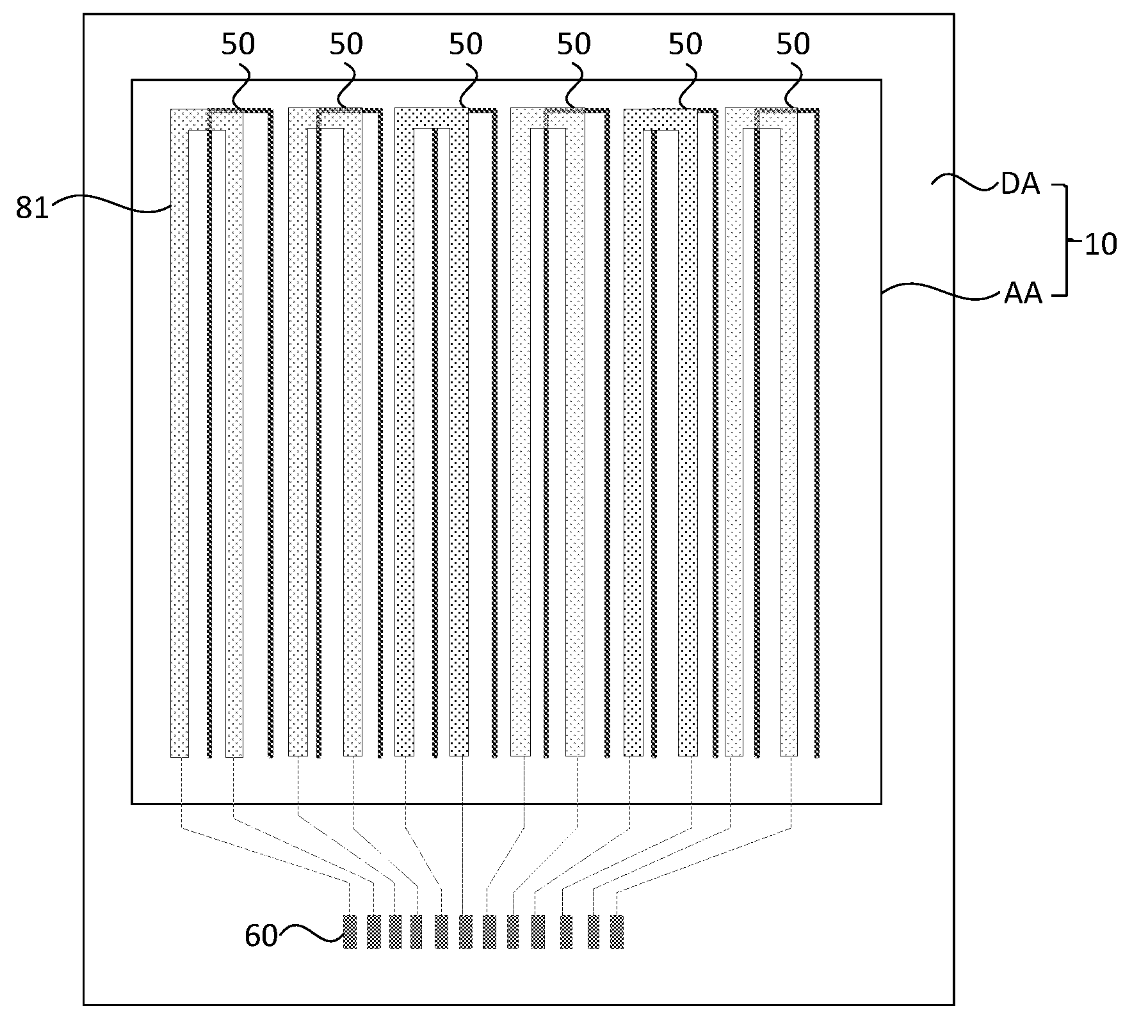
FIG. 12 is a schematic structure diagram showing a relative positional relationship between a temperature sensor and a display panel according to an embodiment of the present disclosure.
Figure 13:
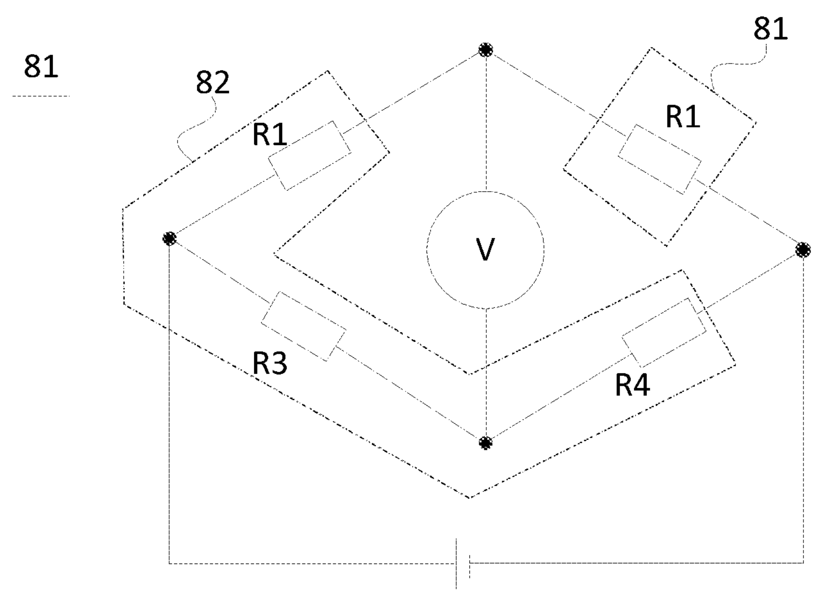
FIG. 13 is a schematic diagram of circuit elements of a Wheatstone bridge according to an embodiment of the present disclosure.

FIG. 12 is a schematic structure diagram of a relative positional relationship between a temperature sensor and a display panel according to an embodiment of the present disclosure. FIG. 13 is a schematic diagram of circuit elements of a Wheatstone bridge according to an embodiment of the present disclosure. Referring to FIG. 12 and FIG. 13, in an embodiment, the display module further includes a flexible circuit board and a printed circuit board (not shown in FIG. 12), the control circuit 20 is disposed on the flexible circuit board or the printed circuit board, and the heating circuit 30 is disposed on the flexible circuit board or the printed circuit board; the temperature sensor 80 includes a Wheatstone bridge, the Wheatstone bridge includes a first type of resistor 81 and a second type of resistor 82, the first type of resistor 81 is integrated in the display panel 10, and the second type of resistor 82 is integrated in the display panel 10, disposed on the flexible circuit board, or disposed on the printed circuit board.

Specifically, referring to FIG. 13, the first type of resistor 81 includes a first resistor R1 whose resistance value changes with the temperature of the display panel 10, the second type of resistor 82 includes a second resistor R2, a third resistor R3, and a fourth resistor R4, and the resistance value of the second type of resistor 82 is fixed. When the resistance value of the first type of resistor 81 changes, the voltage value V output by the Wheatstone bridge will change. After receiving the voltage value V (i.e., the temperature signal) fed back by the Wheatstone bridge, the control circuit 20 can acquire the temperature of the area where the Wheatstone bridge is located in the display panel 10 by looking up a voltage value-temperature comparison table.

Specifically, when the first type of resistor 81 is integrated in the display panel 10, a single film layer may be provided in the display panel 10 to form the first type of resistor 81, or the first type of resistor 81 is disposed in a certain inherent film layer of the display panel 10. Such setting is not limited herein. Exemplarily, the first type of resistor 81 may be disposed at the same layer as a scanning signal line or a data signal line in the array substrate. It may be understood that the first type of resistor 81 of the Wheatstone bridge is integrated into the display panel 10 such that the first type resistor 81 can sense the temperature change of the display panel 10 in time, reducing the heat loss in the process of transferring heat from the display panel 10 to the first type of resistor 81, further reducing the temperature acquisition error of the Wheatstone bridge, and conducive to improving the temperature control accuracy of the control circuit 20 on the display panel 10.

Specifically, when the Wheatstone bridge is disposed on the flexible circuit board or the printed circuit board, the Wheatstone bridge and the control circuit 20 may be both disposed on the flexible circuit board or may be both disposed on the printed circuit board. Thus, the Wheatstone bridge and the control circuit 20 may be electrically connected by a circuit on the flexible circuit board or on the printed circuit board, conducive to eliminating the connection process of the Wheatstone bridge and the control circuit 20 and improving the assembly efficiency of the display module. It may be understood that the Wheatstone bridge is disposed outside the display panel 10, facilitating replacement by a Wheatstone bridge that can normally operate when a Wheatstone bridge fails.

In an embodiment, the heating circuit 30 and the control circuit 20 are both disposed on the flexible circuit board or both disposed on the printed circuit board. Thus, the heating circuit 30 and the control circuit 20 may be electrically connected by a circuit on the flexible circuit board or on the printed circuit board, conducive to eliminating the connection process of the heating circuit 30 and the control circuit 20 and improving the assembly efficiency of the display module.

Specifically, the plurality of heating lines 50 may be distributed in the display area AA of the display panel 10 in various ways. Typical examples will be described below but are not intended to limit the present application.

In an embodiment, the display panel includes at least two heating zones; and each heating zone is provided with at least one temperature sensor.

Specifically, the arrangement direction of the heating zones intersects the extension direction of the heating lines, and at least one heating line is provided in each heating zone. The number of heating zones obtained by dividing the area of the display panel 10 to be heated may be set according to the actual situation by those skilled in the art and is not limited herein.

It may be understood that temperatures may vary throughout the display panel 10 and that the area of the display panel 10 to be heated is divided into at least two heating zones such that the control circuit 20 can adjust the heating control signal in real time for the temperature signal in each heating zone, thus enabling the heating circuit 30 to output a heating signal matching the temperature in the heating zone. Exemplarily, when the control circuit includes a single-chip microcomputer and the heating circuit 30 includes a boost chopper circuit, the heating control signal may be a pulse width modulation (PWM) signal, and the control circuit 20 can adjust the duty cycle of the PWM signal according to the temperature signal, thereby enabling the boost chopper circuit to adjust its output heating signal according to the PWM signal.

Figure 14:
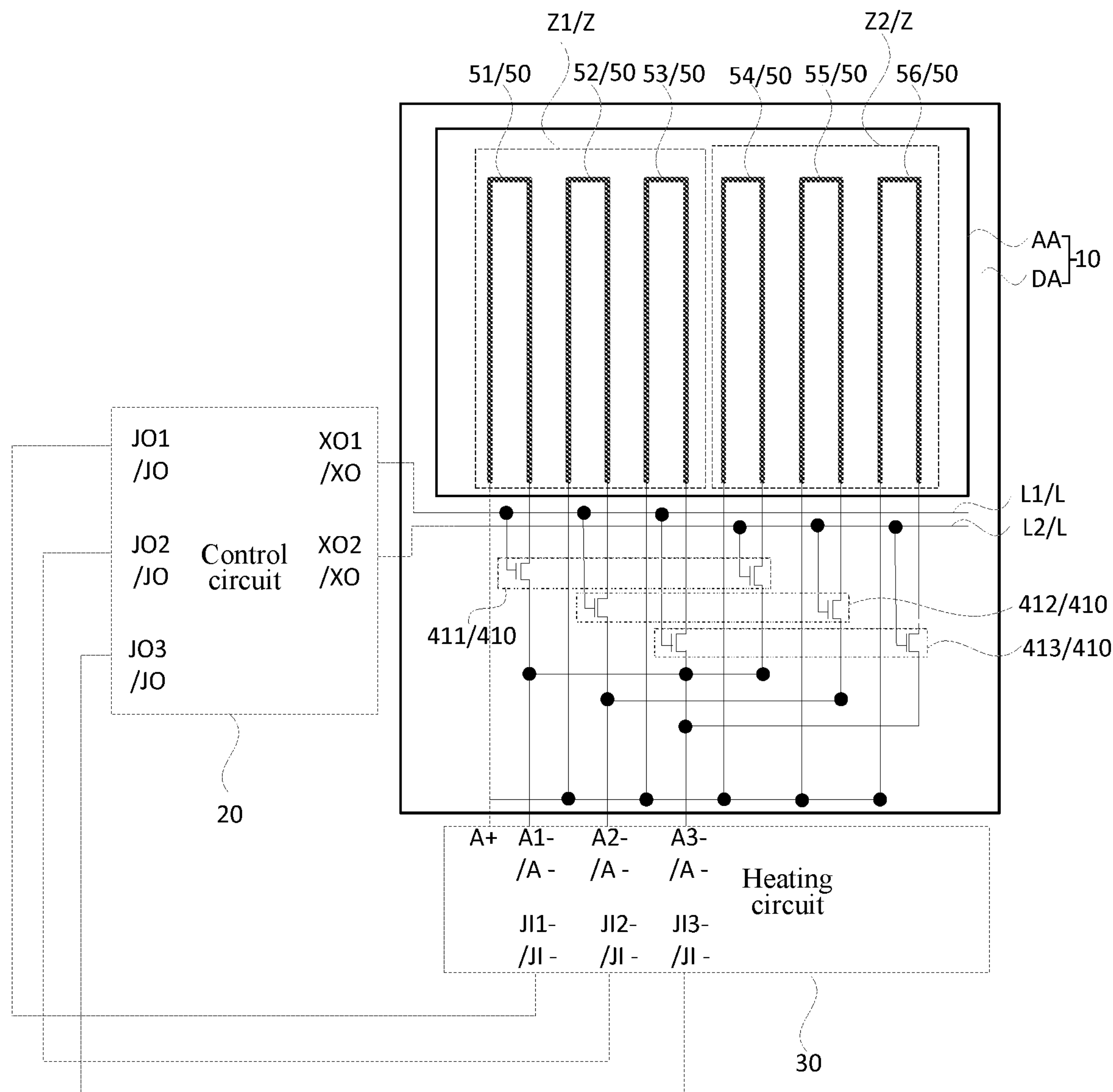
FIG. 14 is a schematic diagram showing an arrangement relationship between heating zones and heating lines according to an embodiment of the present disclosure.

FIG. 14 is a schematic diagram of an arrangement relationship between heating zones and heating lines according to an embodiment of the present disclosure. Referring to FIG. 14, in an embodiment, heating lines 50 disposed in a same heating zone Z are electrically connected to different gating units 410.

Specifically, when the heating lines 50 disposed in the same heating zone Z are electrically connected to different gating units 410, different first type of heating signal output terminals A− provide heating signals for the heating lines 50 disposed in the same heating zone Z, so that the heating lines 50 disposed in the same heating zone Z can simultaneously generate heat according to the respective received heating signals and simultaneously heat the heating zone Z, thereby improving the speed of heating the heating zone Z to a preset temperature.

Exemplarily, with continued reference to FIG. 14, the heating line 51 disposed in the heating zone Z1 is electrically connected to the gating unit 411, the heating line 52 in the heating zone Z1 is electrically connected to the gating unit 412, and the heating line 53 in the heating zone Z1 is electrically connected to the gating unit 413; the heating line 54 disposed in the heating zone Z2 is electrically connected to the gating unit 411, the heating line 55 disposed in the heating zone Z2 is electrically connected to the gating unit 412, and the heating line 56 disposed in the heating zone Z2 is electrically connected to the gating unit 413. Thus, the heating line 51, the heating line 52, and the heating line 53 in the heating zone Z1 can simultaneously receive heating signals to heat the heating zone Z1 of the display panel 10. The heating line 54, the heating line 55, and the heating line 56 in the heating zone Z2 can simultaneously receive heating signals to heat the heating zone Z2 of the display panel 10.

It is to be noted that the number of temperature sensors (not shown in FIG. 14) provided in each heating zone Z may be set according to the actual situation by those skilled in the art and is not limited herein. Exemplarily, each heating zone Z is provided with one temperature sensor, and at this time, the heating lines 50 disposed in the same heating zone Z receive heating signals having the same specific value (voltage value or current value). For FIG. 14, when each heating zone Z is provided with one temperature sensor, the duty cycles of the PWM signals received by the heating control signal input terminal JI1, the heating control signal input terminal JI2 and the heating control signal input terminal JI3 are the same, and the heating signal output from the first type of heating signal output terminal A1− and the second type of heating signal output terminal, the heating signal output from the first type of heating signal output terminal A2− and the second type of heating signal output terminal, and the heating signal output from the first type of heating signal output terminal A3− and the second type of heating signal output terminal have the same specific value (voltage value or current value). When each heating line 50 is correspondingly provided with one temperature sensor, the specific value of the heating signal received by each heating line 50 matches the temperature signal collected by the respective temperature sensor. For FIG. 14, when each heating line 50 is correspondingly provided with one temperature sensor, if the heating lines 50 heat the heating zone Z1, the duty cycles of the PWM signals received by the heating control signal input terminal JI1, the heating control signal input terminal JI2 and the heating control signal input terminal JI3 match the temperature signals collected by the temperature sensors corresponding to the heating line 51, the heating line 52 and the heating line 53 respectively, so that the heating signal output from the first type of heating signal output terminal A1− and the second type of heating signal output terminal, the heating signal output from the first type of heating signal output terminal A2− and the second type of heating signal output terminal, and the heating signal output from the first type of heating signal output terminal A3− and the second type of heating signal output terminal match the temperature signals collected by the temperature sensors corresponding to the heating line 51, the heating line 52 and the heating line 53 respectively. If the heating lines 50 heat the heating zone Z2 at this time, the same principle is used and will not be repeated herein.

Figure 15:
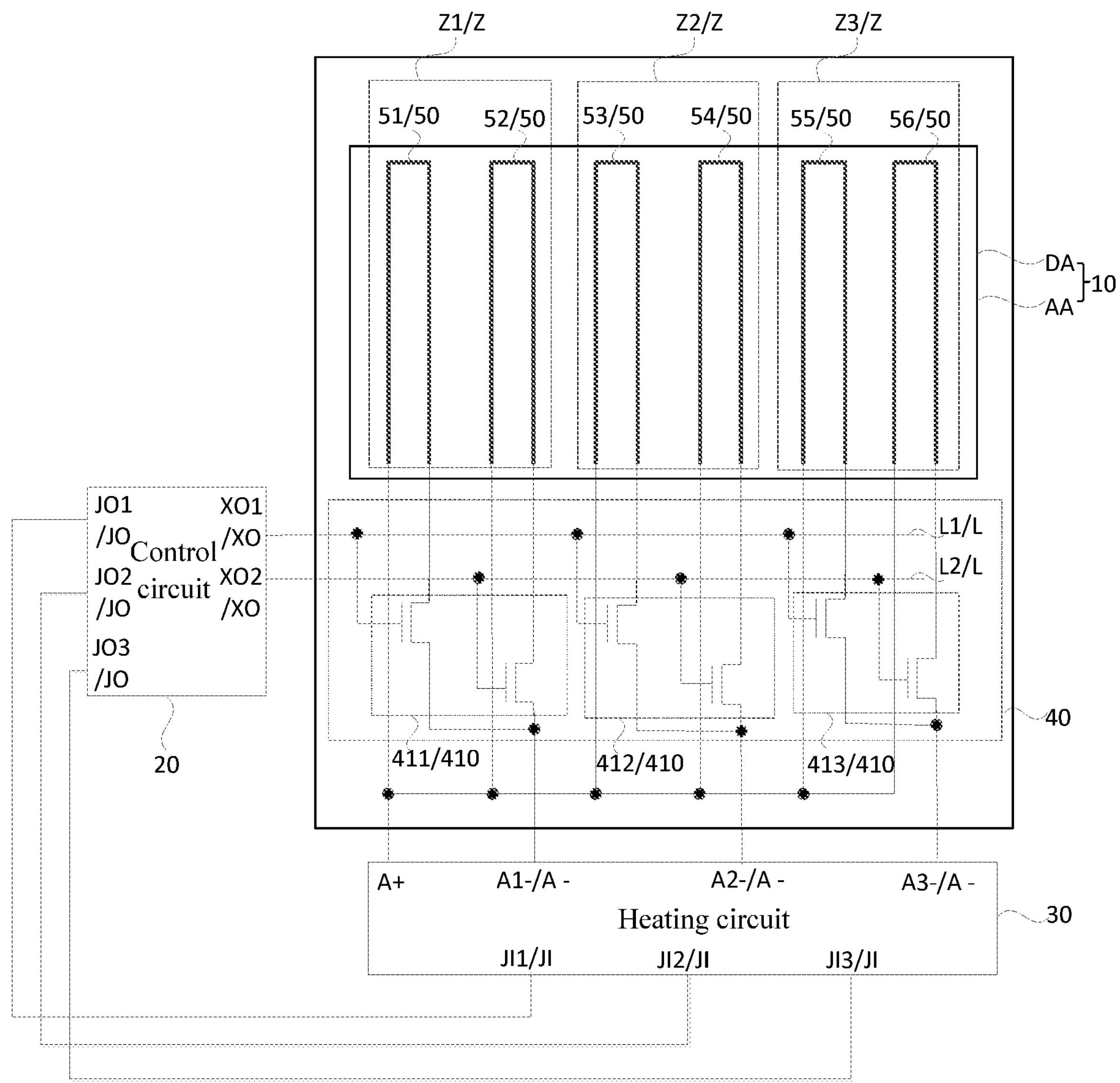
FIG. 15 is a schematic diagram showing another arrangement relationship between heating zones and heating lines according to an embodiment of the present disclosure.

FIG. 15 is a schematic diagram of another arrangement relationship between heating zones and heating lines according to an embodiment of the present disclosure. Referring to FIG. 15, in an embodiment, a plurality of heating lines 50 disposed in a same heating zone Z are electrically connected to a same gating unit 410.

Specifically, when the heating lines 50 disposed in the same heating zone Z are electrically connected to the same gating unit 410, the heating lines 50 disposed in the same heating zone Z heat the heating zone according to the characteristics of the gating unit 410 in a time-sharing manner. When the heating circuit 30 includes at least two first type of heating signal output terminals A− and the gating circuit includes at least two gating units 410, at least two heating zones Z in the display panel 10 can be heated simultaneously, thus conducive to achieving temperature uniformity throughout the display panel 10.

Exemplarily, with continued reference to FIG. 15, the heating line 51 and the heating line 52 disposed in the heating zone Z1 are each electrically connected to the gating unit 411; the heating line 53 and the heating line 54 disposed in the heating zone Z2 are each electrically connected to the gating unit 412; the heating line 55 and the heating line 56 disposed in the heating zone Z3 are each electrically connected to the gating unit 413. Thus, the heating line 51, the heating line 53, and the heating line 55 can simultaneously receive heating signals to heat the heating zone Z1, the heating zone Z2, and the heating zone Z3, respectively. The heating line 52, the heating line 54, and the heating line 56 can simultaneously receive heating signals to heat the heating zone Z1, the heating zone Z2, and the heating zone Z3, respectively.

It is to be noted that the number of temperature sensors provided in each heating zone Z may be set according to the actual situation by those skilled in the art and is not limited herein. Exemplarily, each heating zone Z is provided with one temperature sensor, and at this time, the specific value of the heating signal received by each heating line 50 disposed in a same heating zone Z matches the temperature signal collected by the temperature sensor during the period during which the heating signal is received. Exemplarily, each heating line is correspondingly provided with one corresponding temperature sensor 80, and at this time, the specific value of the heating signal received by each heating line 50 matches the temperature signal collected by the respective temperature sensor.

Figure 16:
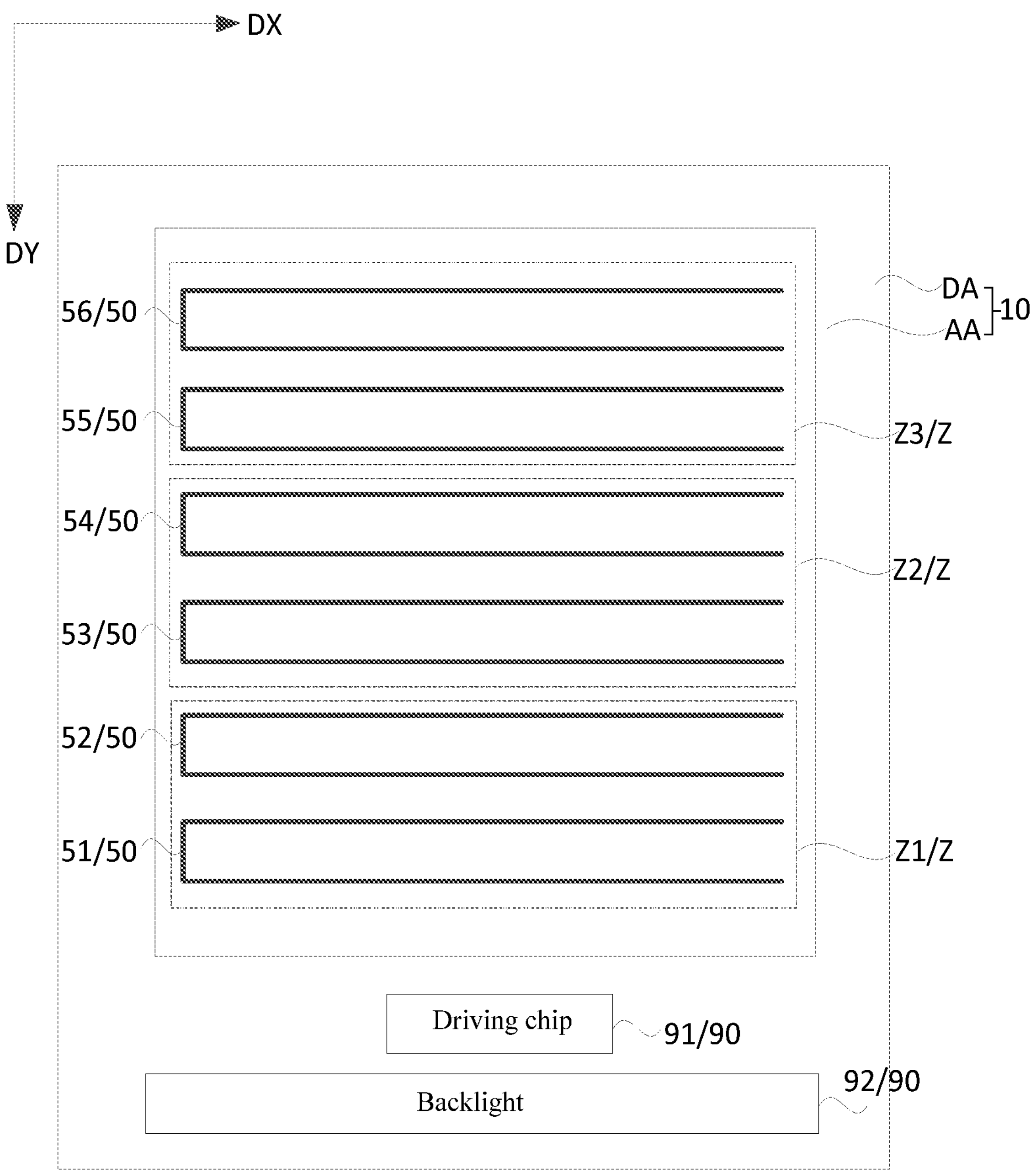
FIG. 16 is a schematic diagram showing an arrangement of heating zones and a heating source device according to an embodiment of the present disclosure.
Figure 17:
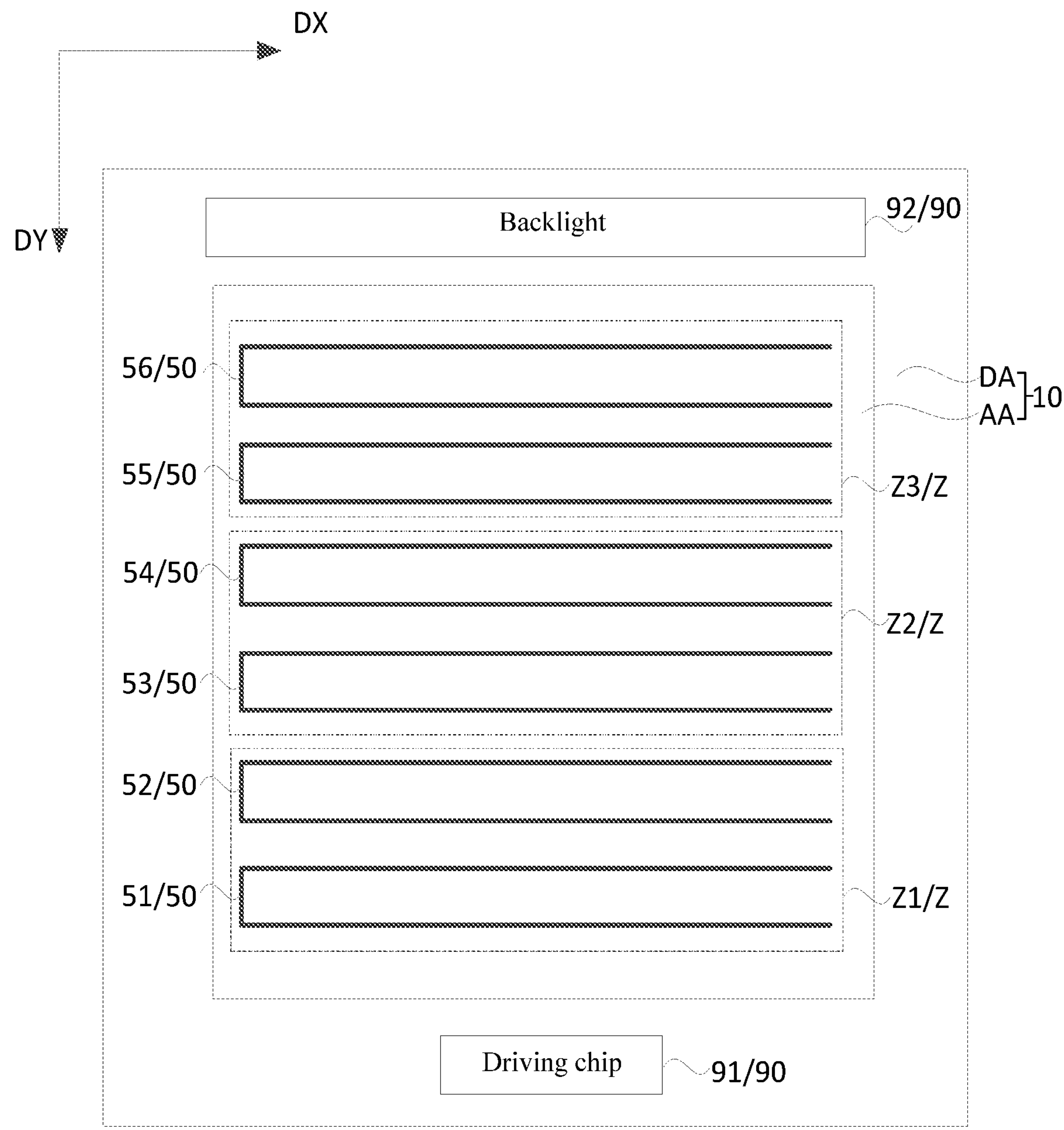
FIG. 17 is a schematic diagram showing another arrangement of heating zones and a heating source device according to an embodiment of the present disclosure.

FIG. 16 is a schematic diagram of an arrangement of heating zones and a heating source device according to an embodiment of the present disclosure. FIG. 17 is a schematic diagram of another arrangement of heating zones and a heating source device according to an embodiment of the present disclosure. Referring to FIG. 16 and FIG. 17, in an embodiment, the display module further includes a heating source device 90; the display panel 10 includes at least two heating zones Z; the heating zones Z and the heating source device 90 are arranged in a first direction DX, the heating line 50 extends in a second direction DY, and the first direction DX intersects the second direction DY; and a heating zone Z closest to the heating source device 90 among the at least two heating zones Z is a first heating zone; and the heating circuit 30 provides less power to the first heating zone than to other heating zones Z.

Specifically, the heating source device 90 described herein refers to a device which is accompanied by heat generation during normal operation and determined as the heating source device 90 when the portion of the heat generated within the unit time that can be absorbed by the display panel 10 exceeds a preset threshold value. The specific value of the preset threshold value may be set according to the actual situation by those skilled in the art. In an embodiment, the heating source device 90 includes at least one of a driver chip 91 or a backlight 92.

It may be understood that since heat is generated when the heating source device 90 normally operates, the heating source device 90 and the heating zones Z are arranged in the first direction DX such that the temperature of the first heating zone closer to the heating source device 90 is relatively high relative to the heating zone Z not adjacent to the heating source device 90 and the power consumption required to heat the first heating zone closer to the heating source device 90 to a preset temperature is small, conducive to saving power consumption.

Referring to FIG. 16 and FIG. 17, in an embodiment, the heating source device 90 includes the driver chip 91 and the backlight 92; the driver chip 91 and the backlight 92 are disposed on two opposite sides of the display area AA of the display panel 10, that is, the driver chip 91 and the backlight 92 are disposed adjacent to different first heating zones (as shown in FIG. 17); or the driver chip 91 and the backlight 92 are disposed on the same side of a same first heating zone (as shown in FIG. 16).

Specifically, when the driver chip 91 and the backlight 92 are disposed adjacent to different first heating zones, for example, in FIG. 17, when the backlight 92 is disposed adjacent to the heating zone Z3 and the driver chip 91 is disposed adjacent to the heating zone Z1, the heat dissipated by the backlight 92 and the driver chip 91 is transferred to the different first heating zones, respectively. Thus, the heat dissipated by the heating source device 90 can be dispersed into at least two first heating zones, conducive to improving the temperature uniformity of each heating zone Z in the display panel 10.

Specifically, when the driver chip 91 and the backlight 92 are disposed on the same side of the same first heating zone, for example, in FIG. 16, when the driver chip 91 and the backlight 92 are disposed on the same side of the heating zone Z1, the heat dissipated by the backlight 92 and the driver chip 91 is transferred to the same first heating zone. Thus, the heat dissipated by the heating source device 90 can be concentrated in one first heating zone, conducive to heating the one first heating zone to a preset temperature as soon as possible.

Figure 18:
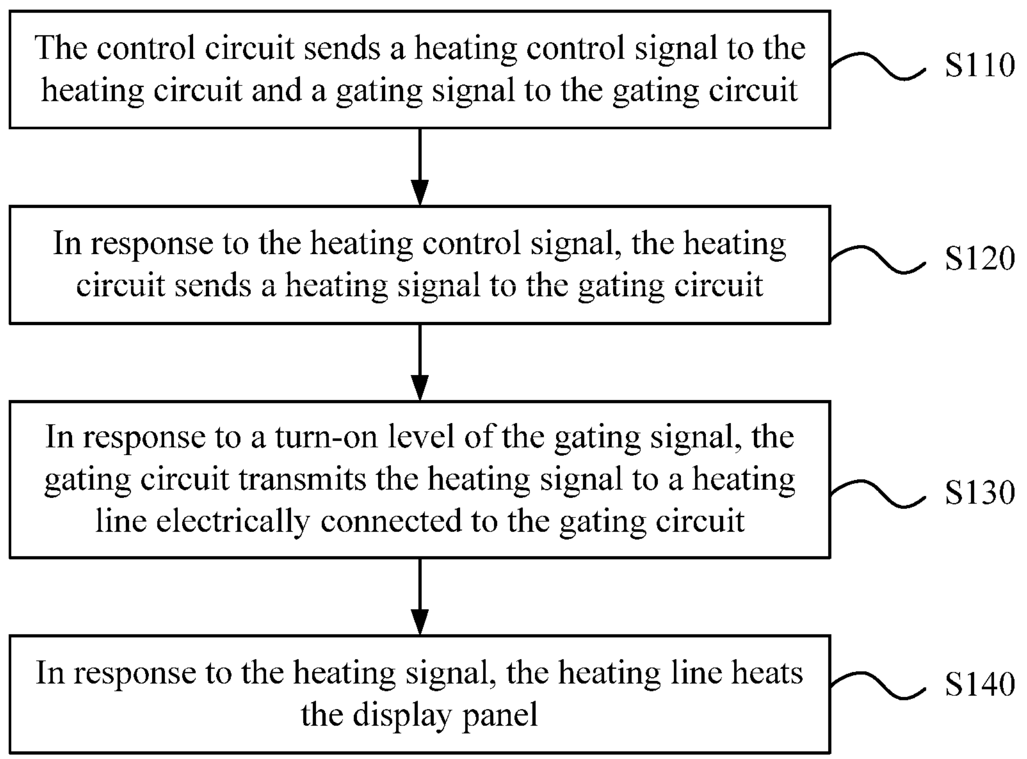
FIG. 18 is a flowchart of a heating method of a display module according to an embodiment of the present disclosure.

Based on the same inventive concept described above, a heating method of a display module is further provided in an embodiment of the present disclosure. FIG. 18 is a flowchart of a heating method of a display module according to an embodiment of the present disclosure. Referring to FIG. 18, the method includes steps described below.

In S110, the control circuit sends a heating control signal to the heating circuit and a gating signal to the gating circuit.

In S120, in response to the heating control signal, the heating circuit sends a heating signal to the gating circuit.

In S130, in response to a turn-on level of the gating signal, the gating circuit transmits the heating signal to a heating line electrically connected to the gating circuit.

In S140, in response to the heating signal, the heating line heats the display panel.

According to the driving method of the display module provided in the embodiment of the present disclosure, the control circuit controls the level state (turn-on level or turn-off level) of each gating signal sent to the gating circuit such that the heating circuit can provide heating signals for a plurality of heating lines in a time-sharing manner. Furthermore, the plurality of heating lines provides heat for the display panel in the display module in the time-sharing manner, solving the problem, in the related art, of an increase in the number of heating circuits or in the design difficulty caused by an increase in the number of heating lines, and achieving the effects of not increasing the number of heating circuits and of reducing the cost of the display module.

In an embodiment, the display module further includes a temperature sensor, and each heating line is correspondingly provided with one temperature sensor; the heating lines are divided into N heating line groups, the gating circuit includes a plurality of gating signal lines, and heating lines in a same heating line group are electrically connected to different gating units and correspond to a same gating signal line; where N is a positive integer.

The method further includes the temperature sensor collecting a temperature signal of the display panel and sends the temperature signal to the control circuit.

The step in which the control circuit sends a heating control signal to the heating circuit and a gating signal to the gating circuit includes a step described below.

In response to a temperature signal fed back by a temperature sensor corresponding to an i-th heating line group and a preset heating temperature, the control circuit sends the heating control signal to the heating circuit and sends a gating signal having a state of the turn-on level to a gating signal line corresponding to the i-th heating line group; where i is a positive number and $1 \leq i \leq N$.

Exemplarily, the heating process of the display module will be described below by using the display panel having the arrangement relationship between display zones and heating lines shown in FIG. 14 as an example. Each heating line is correspondingly provided with one temperature sensor. A first heating line group includes the heating line 51, the heating line 52, and the heating line 53; a second heating line group includes the heating line 54, the heating line 55, and the heating line 56.

In stage T1, six temperature sensors collect the temperature signals of the display panel in respective regions and send the temperature signals to the control circuit 20. Then, the control circuit 20 generates a heating control signal according to the temperature signal collected by the temperature sensor corresponding to the heating line 51 and sends the heating control signal through the heating control signal output terminal JO1 to the heating control signal input terminal JI1− of the heating circuit 30. The control circuit 20 also generates another heating control signal according to the temperature signal collected by the temperature sensor corresponding to the heating line 52 and sends the heating control signal through the heating control signal output terminal JO2 to the heating control input terminal JI2− of the heating circuit 30. The control circuit 20 also generates another heating control signal according to the temperature signal collected by the temperature sensor corresponding to the heating line 53 and sends the heating control signal through the heating control signal output terminal JO3 to the heating control input terminal JI3− of the heating circuit 30. Moreover, the control circuit 20 provides the turn-on level for the gating signal line L1 and simultaneously provides the turn-off level for the gating signal line L2. Then, the heating circuit 30 generates three heating signals according to the three heating control signals input from the heating control signal input terminal JI1–, the heating control input terminal JI2–, and the heating control input terminal JI3–, respectively and outputs the three heating signals from the first type of heating signal output terminal A1–, the first type of heating signal output terminal A2–, and the first type of heating signal output terminal A3–, respectively. Then, the heating line 51, the heating line 52, and the heating line 53 heat the heating zone Z1 in response to the respective received heating signals.

In stage T2, the six temperature sensors collect the temperature signals of the display panel in respective regions and send the temperature signals to the control circuit 20. Then, the control circuit 20 generates a heating control signal according to the temperature signal collected by the temperature sensor corresponding to the heating line 54 and sends the heating control signal through the heating control signal output terminal JO1 to the heating control signal input terminal JI1– of the heating circuit 30. The control circuit 20 also generates another heating control signal according to the temperature signal collected by the temperature sensor corresponding to the heating line 55 and sends the heating control signal through the heating control signal output terminal JO2 to the heating control input terminal JI2– of the heating circuit 30. The control circuit 20 also generates another heating control signal according to the temperature signal collected by the temperature sensor corresponding to the heating line 56 and sends the heating control signal through the heating control signal output terminal JO3 to the heating control input terminal JI3– of the heating circuit 30. Moreover, the control circuit 20 provides the turn-off level for the gating signal line L1 and simultaneously provides the turn-on level for the gating signal line L2. Then, the heating circuit 30 generates three heating signals according to the three heating control signals input from the heating control signal input terminal JI1–, the heating control input terminal JI2–, and the heating control input terminal JI3–, respectively and outputs the three heating signals from the first type of heating signal output terminal A1–, the first type of heating signal output terminal A2–, and the first type of heating signal output terminal A3–, respectively. Then, the heating line 54, the heating line 55, and the heating line 56 heat the heating zone Z2 in response to the respective received heating signals.

It is to be noted that the above are merely some embodiments of the present disclosure and the technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, though the present disclosure has been described in detail through the embodiments described above, the present disclosure is not limited to the embodiments described above and may include other equivalent embodiments without departing from the concept of the present disclosure. The scope of the present disclosure is determined by the scope of the appended claims.

What is claimed is:

1. A display module, comprising:

a display panel, a control circuit, a heating circuit, a gating circuit, and a plurality of heating lines;

wherein the heating circuit comprises at least one first type of heating signal output terminal and at least one second type of heating signal output terminal, wherein the gating circuit comprises at least one gating unit, wherein a gating signal output terminal of the control circuit is electrically connected to a gating signal input terminal of the gating circuit, and a heating control signal output terminal of the control circuit is electrically connected to a heating control signal input terminal of the heating circuit;

wherein the heating circuit and the gating circuit comprise at least one of the following connection modes: each of the at least one first type of heating signal output terminal is electrically connected to a first type of signal input terminal of a gating unit among the at least one gating unit, and a first type of signal output terminal of the gating unit among the at least one gating unit is electrically connected to a first terminal of a heating line among the plurality of heating lines; or wherein each of the at least one second type of heating signal output terminal is electrically connected to a second type of signal input terminal of the gating unit among the at least one gating unit, and wherein a second type of signal output terminal of the gating unit among the at least one gating unit is electrically connected to a second terminal of the heating line among the plurality of heating lines; and wherein first terminals of the plurality of heating lines electrically connected to a same one of the at least one gating unit are electrically connected to a same one of the at least one first type of heating signal output terminal.

2. The display module of claim 1, wherein the at least one first type of heating signal output terminal is electrically connected to first type of signal input terminals of the gating circuit, and first type of signal output terminals of the gating circuit are electrically connected to first terminals of the plurality of heating lines;

wherein the gating circuit further comprises: a plurality of first thin-film transistors and a plurality of gating signal lines, wherein each of the plurality of gating signal lines is electrically connected to a gating output terminal of the control circuit;

wherein the plurality of first thin-film transistors is electrically connected to first terminals of respective ones of the plurality of heating lines, and wherein the plurality of first thin-film transistors in the same one of the at least one gating unit corresponds to one preset trace and is electrically connected to the same one of the at least one first type of heating signal output terminal; and wherein the plurality of first thin-film transistors in the same one of the at least one gating unit has drains electrically connected to first terminals of corresponding ones of the plurality of heating lines, has sources corresponding to the one preset trace and electrically connected to the same one of the at least one first type of heating signal output terminal, and has gates electrically connected to different gating signal lines.

3. The display module of claim 1, wherein second terminals of the plurality of heating lines are electrically connected to a same one of the at least one second type of heating signal output terminal.

4. The display module of claim 3, wherein the at least one second type of heating signal output terminal is electrically connected to second type of signal input terminals of the gating circuit, wherein second type of signal output terminals of the gating circuit are electrically connected to second terminals of the plurality of heating lines, and a gating signal line is electrically connected to a gating output terminal of the control circuit;

wherein the gating circuit comprises: a plurality of first thin-film transistors and a plurality of gating signal lines, wherein each of the plurality of gating signal lines is electrically connected to a gating output terminal of the control circuit;

wherein each of the plurality of first thin-film transistors is electrically connected to a second terminal of a respective one of the plurality of heating lines; and wherein the plurality of first thin-film transistors in the same one of the at least one gating unit has drains being electrically connected to second terminals of corresponding ones of the plurality of heating lines, has sources electrically connected to the same one of the at least one second type of heating signal output terminal, and has gates electrically connected to a different one of the plurality of gating signal lines.

5. The display module of claim 1, wherein the plurality of heating lines and the at least one gating unit are integrated in the display panel.

6. The display module of claim 1, further comprising:

a backlight module disposed opposite to the display panel, wherein the plurality of heating lines is disposed on a side of the display panel facing towards or facing away from the backlight module;

a flexible circuit board; and a printed circuit board;

wherein the at least one gating unit is disposed on the flexible circuit board or the printed circuit board.

7. The display module of claim 1, further comprising a temperature sensor, wherein a temperature signal input terminal of the control circuit is electrically connected to an output terminal of the temperature sensor.

8. The display module of claim 7, further comprising a flexible circuit board and a printed circuit board;

wherein the control circuit is disposed on the flexible circuit board or the printed circuit board, and the heating circuit is disposed on the flexible circuit board or the printed circuit board; and wherein the temperature sensor comprises a Wheatstone bridge, wherein the Wheatstone bridge comprises a first type of resistor and a second type of resistor, wherein the first type of resistor is integrated in the display panel; wherein the second type of resistor is integrated in the display panel, disposed on the flexible circuit board, or disposed on the printed circuit board.

9. The display module of claim 1, wherein the display panel comprises at least two heating zones; wherein each of the at least two heating zones is provided with at least one temperature sensor.

10. The display module of claim 9, wherein heating lines disposed in a same one of the at least two heating zones is electrically connected to different gating units of the at least one gating unit.

11. The display module of claim 9, wherein heating lines disposed in a same one of the at least two heating zones is electrically connected to a same one of the at least one gating unit.

12. The display module of claim 11, wherein each of the plurality of heating lines is respectively provided with one temperature sensor.

13. The display module of claim 1, further comprising a heating source device;

wherein the display panel comprises at least two heating zones; wherein the at least two heating zones and the heating source device are arranged along a first direction, wherein each of the plurality of heating lines extends in a second direction, wherein the first direction intersects the second direction; and wherein one of the at least two heating zones closer to the heating source device is a first heating zone; and wherein the heating circuit provides less power to the first heating zone than to other heating zones of the at least two heating zones.

14. The display module of claim 13, wherein the heating source device comprises at least one of a driver chip or a backlight.

15. The display module of claim 14, wherein the heating source device comprises both the driver chip and the backlight; and wherein the driver chip and the backlight are disposed on two opposite sides of a display area of the display panel, and wherein the driver chip and the backlight are disposed adjacent to different first heating zones; or the driver chip and the backlight are disposed on a same side of a same first heating zone.

16. A heating method of a display module, wherein the heating method is applicable to the display module of claim 1 and comprises:

sending, by the control circuit, a heating control signal to the heating circuit and a gating signal to the gating circuit;

in response to the heating control signal, sending, by the heating circuit, a heating signal to the gating circuit;

in response to a turn-on level of the gating signal, transmitting, by the gating circuit, the heating signal to a heating line of the plurality of heating lines electrically connected to the gating circuit; and in response to the heating signal, heating, by the heating line, the display panel.

17. The heating method of the display module of claim 16, wherein the display module further comprises a plurality of temperature sensors, wherein each of the plurality of heating lines is respectively provided with one of the plurality of temperature sensors; wherein the plurality of heating lines is divided into N heating line groups; wherein the gating circuit comprises a plurality of gating signal lines, wherein the plurality of heating lines in a same one of the N heating line groups is electrically connected to different gating units and correspond to a same one of the plurality of gating signal lines; wherein N is a positive integer;

wherein the method further comprises: collecting, by the temperature sensor, a temperature signal of the display panel and sending the temperature signal to the control circuit; and wherein sending, by the control circuit, the heating control signal to the heating circuit and the gating signal to the gating circuit comprises:

in response to a temperature signal fed back by the temperature sensor corresponding to an i-th heating line group and a preset heating temperature, sending, by the control circuit, the heating control signal to the heating circuit and a gating signal which has a state of the turn-on level to a gating signal line corresponding to the i-th heating line group; wherein i is a positive number and $1 \leq i \leq N$.

* * * * *